(12) United States Patent
Mizusaki

(10) Patent No.: US 11,366,357 B2
(45) Date of Patent: Jun. 21, 2022

(54) LIQUID CRYSTAL DISPLAY DEVICE, PRODUCTION METHOD FOR LIQUID CRYSTAL DISPLAY DEVICE, AND RETARDATION LAYER-FORMING MONOMER

(71) Applicant: SHARP KABUSHIKI KAISHA, Sakai (JP)

(72) Inventor: Masanobu Mizusaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 79 days.

(21) Appl. No.: 16/497,948

(22) PCT Filed: Mar. 22, 2018

(86) PCT No.: PCT/JP2018/011329
§ 371 (c)(1),
(2) Date: Dec. 12, 2019

(87) PCT Pub. No.: WO2018/180853
PCT Pub. Date: Oct. 4, 2018

(65) Prior Publication Data
US 2021/0109392 A1 Apr. 15, 2021

(30) Foreign Application Priority Data
Mar. 28, 2017 (JP) .............................. JP2017-063066

(51) Int. Cl.
*G02F 1/13363* (2006.01)
*C08F 20/60* (2006.01)
*G02F 1/1337* (2006.01)

(52) U.S. Cl.
CPC .......... *G02F 1/13363* (2013.01); *C08F 20/60* (2013.01); *G02F 1/133788* (2013.01);
(Continued)

(58) Field of Classification Search
CPC ........... G02F 1/13363; G02F 1/133788; G02F 1/133634; C08F 20/60; C09K 2323/03; C09K 2323/035; C09K 2323/02
(Continued)

(56) References Cited

U.S. PATENT DOCUMENTS

| 5,415,864 A | 5/1995 | Kopecek et al. |
| 2009/0079913 A1 | 3/2009 | Nishikawa et al. |

(Continued)

FOREIGN PATENT DOCUMENTS

| JP | H05-507948 A | 11/1993 |
| JP | 2005-187618 A | 7/2005 |

(Continued)

*Primary Examiner* — Ruiyun Zhang
(74) *Attorney, Agent, or Firm* — ScienBiziP, P.C.

(57) ABSTRACT

The present invention is a liquid crystal display device including a pair of substrates, a liquid crystal layer which is sandwiched between the pair of substrates and contains a liquid crystal material, and an alignment layer which is in contact with the liquid crystal layer. In this liquid crystal display device, at least one of the pair of substrates has a retardation layer on a side toward the liquid crystal layer, the alignment layer aligns a liquid crystal compound in the liquid crystal material, the retardation layer contains a polymer formed by polymerization of at least one monomer, and the at least one monomer includes a specific monomer.

15 Claims, 2 Drawing Sheets

Application of polarized light

(52) U.S. Cl.
CPC ...... *C09K 2323/02* (2020.08); *C09K 2323/03* (2020.08); *G02F 1/133634* (2013.01)

(58) Field of Classification Search
USPC .................. 428/1.3, 1.33; 349/117; 526/306
See application file for complete search history.

(56) References Cited

U.S. PATENT DOCUMENTS

| | | | |
|---|---|---|---|
| 2013/0039962 | A1 | 2/2013 | Smets et al. |
| 2015/0218409 | A1 | 8/2015 | Matsuo et al. |

FOREIGN PATENT DOCUMENTS

| | | | |
|---|---|---|---|
| JP | 2007-114739 | A | 5/2007 |
| JP | 5143351 | B2 | 2/2013 |
| JP | 2014-524973 | A | 9/2014 |
| JP | 2015-145448 | A | 8/2015 |

LIQUID CRYSTAL DISPLAY DEVICE, PRODUCTION METHOD FOR LIQUID CRYSTAL DISPLAY DEVICE, AND RETARDATION LAYER-FORMING MONOMER

TECHNICAL FIELD

The present invention relates to a liquid crystal display device, a production method for a liquid crystal display device, and a retardation layer-forming monomer. More specifically, the present invention relates to a liquid crystal display device having an in-cell retardation layer, a liquid crystal display device suitable for a production method therefor, a production method for a liquid crystal display device, and a retardation layer-forming monomer suitable for forming an in-cell retardation layer.

BACKGROUND ART

Liquid crystal display panels are widely used in various applications such as laptop PCs, tablet PCs, smartphones, and car navigation systems as well as televisions, and are sometimes used under strong external light such as outdoor light. For this reason, there is a demand for a liquid crystal display device with excellent outdoor visibility, in which reflection of external light is suppressed. As a method for suppressing reflection of external light in a liquid crystal display device, it is widely known to provide a circularly polarizing plate made of a combination of a retardation layer and a linearly polarizing plate.

As a technique related to the retardation layer, for example, Patent Literature 1 discloses a polymerizable liquid crystal composition containing two or more compounds and a compound that is photoisomerized by irradiation with ultraviolet light or visible light. The liquid crystal composition is made of a combination including at least a mesogenic group, a crosslinkable functional group, and a second crosslinkable functional group as a combination of two or more compounds. Patent Literature 2 discloses a production method for a patterned retardation film including a step of providing a polymerizable LC material layer containing at least one photoisomerizable compound on a substrate.

CITATION LIST

Patent Literature

Patent Literature 1: JP 2005-187618 A
Patent Literature 2: JP 5143351 B

SUMMARY OF INVENTION

Technical Problem

In recent years, horizontal alignment modes such as an in-plane switching (IPS) mode and a fringe field switching (FFS) mode have been widely used. In particular, in the horizontal alignment mode, two retardation layers are used in order to simultaneously achieve an external light antireflection function and a liquid crystal display. In that case, the two retardation layers are provided inside and outside a liquid crystal cell.

The retardation layer inside the liquid crystal cell, that is, an in-cell retardation layer is generally formed by polymerization of a reactive mesogen (RM) on an alignment layer. Here, since only one of the in-cell retardation layers (RM) includes the alignment layer, the orientation of the in-cell retardation layer is low. When the orientation of the in-cell retardation layer is low, thermal stability decreases, and retardation of the in-cell retardation layer changes (decreases) after long-term use. In addition, the low orientation of the in-cell retardation layer causes a decrease in contrast ratio due to scattering.

The possible causes are as follows. A currently used reactive mesogenic material for forming an in-cell retardation layer is of a type that is aligned along an alignment treatment direction of an alignment layer, and the reactive mesogen itself cannot induce alignment. In addition, the alignment layer can be formed only on one side of the in-cell retardation layer, and an alignment restraining force of the alignment layer formed from polyimide (polyamic acid) is not sufficient, so that the orientation of the in-cell retardation layer having a thickness of about 1 mm is lowered. In other words, the orientation of the in-cell retardation layer is low, and the randomness is high; therefore, the energy to be randomized by heat exceeds the energy to stabilize alignment, so that the orientation of the in-cell retardation layer further decreases. Due to the decrease in the orientation of the in-cell retardation layer, scattering is likely to occur, and the contrast ratio decreases.

The present invention has been made in view of such a current state of the art and aims to provide a liquid crystal display device excellent in thermal stability of a retardation layer and excellent in contrast ratio, a production method for a liquid crystal display device capable of producing such a liquid crystal display device, and a retardation layer-forming monomer capable of forming a retardation layer having excellent thermal stability.

Solution to Problem

One aspect of the present invention may be a liquid crystal display device including a pair of substrates, a liquid crystal layer which is sandwiched between the pair of substrates and contains a liquid crystal material, and an alignment layer which is in contact with the liquid crystal layer. In this liquid crystal display device, at least one of the pair of substrates has a retardation layer on a side toward the liquid crystal layer, the alignment layer aligns a liquid crystal compound in the liquid crystal material, the retardation layer contains a polymer formed by polymerization of at least one monomer, and the at least one monomer includes a monomer represented by the following Chemical formula (1):

[Chem. 1]

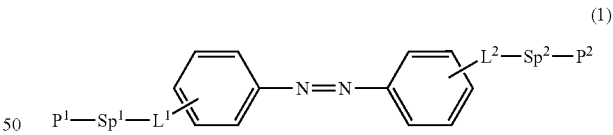

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

Another aspect of the present invention may be a production method for a liquid crystal display device, including applying a solution containing at least one monomer including a monomer represented by the following Chemical formula (1) on at least one of a pair of substrates, irradiating the monomer layer with polarized light to form a retardation layer formed by polymerization and alignment of the at least one monomer, and forming an alignment layer, which aligns a liquid crystal compound in the liquid crystal material, on at least one of the pair of substrates.

[Chem. 2]

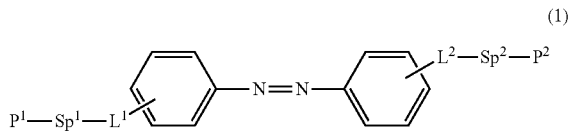

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

Still another aspect of the present invention may be a retardation layer-forming monomer represented by the following Chemical formula (1):

[Chem. 3]

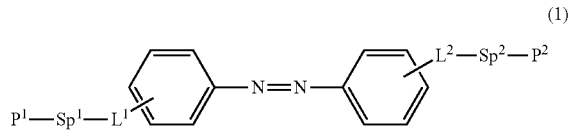

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

Patent Literature 1 discloses a monomer having an azobenzene group represented by the following Chemical formula (D1-1). However, the monomer represented by the following Chemical formula (D1-1) is monofunctional, but the monomer represented by Chemical formula (1) is different in that the monomer is bifunctional. This results in more reliable polymerization and, at the same time, contribution to improvement in the orientation in a retardation layer surface.

[Chem. 4]

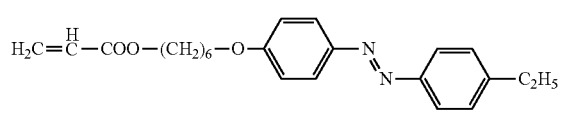

(D1-1)

Patent Literature 2 mentions azobenzenes as photoisomerizable compounds, but does not disclose specific monomers represented by Chemical formula (1).

Advantageous Effects of Invention

According to the liquid crystal display device according to the above aspect of the present invention, it is possible to realize a liquid crystal display device excellent in thermal stability of the retardation layer and excellent in contrast ratio.

According to the production method for a liquid crystal display device according to the above aspect of the present invention, it is possible to produce a liquid crystal display device excellent in thermal stability of the retardation layer and excellent in contrast ratio.

According to the retardation layer-forming monomer according to the above aspect of the present invention, a retardation layer excellent in thermal stability can be realized.

DESCRIPTION OF EMBODIMENTS

Hereinafter, embodiments of the present invention will be described. The present invention is not limited to the contents described in the following embodiments, but can be appropriately modified in design within the range that satisfies the configuration of the present invention.

In the present specification, a "viewing side" means a side closer to a screen (display surface) of a liquid crystal display device, and a "backside" means a side farther from the screen (display surface) of the liquid crystal display device.

In the present specification, a "retardation layer" means a retardation layer that imparts an in-plane retardation of 10 nm or more to light having a wavelength of at least 550 nm. Incidentally, the light having a wavelength of 550 nm is light having a wavelength at which human visual sensitivity is the highest. The in-plane retardation is defined by $R=(ns-nf) \times d$. Here, ns represents a larger one of principal refractive indices nx and ny in an in-plane direction of the retardation layer, and nf represents a smaller one of the principal refractive indices nx and ny in the in-plane direction of the retardation layer. The principal refractive index refers to a value for light having a wavelength of 550 nm unless otherwise noted. An in-plane slow axis of the retardation layer refers to an axis in a direction corresponding to ns, and an in-plane fast axis refers to an axis in a direction corresponding to nf. d represents a thickness of the retardation layer. In the present specification, the "retardation" or "retardation" means an in-plane retardation with respect to light having a wavelength of 550 nm unless otherwise noted.

In the present specification, a space between a pair of base materials included in a pair of substrates sandwiching a liquid crystal layer is referred to as "in-cell", and the outside of the pair of base materials (viewing side and backside) is referred to as "out-cell".

Embodiment 1

Liquid Crystal Display Device and Retardation Layer-Forming Monomer of Embodiment 1

Figure 1:
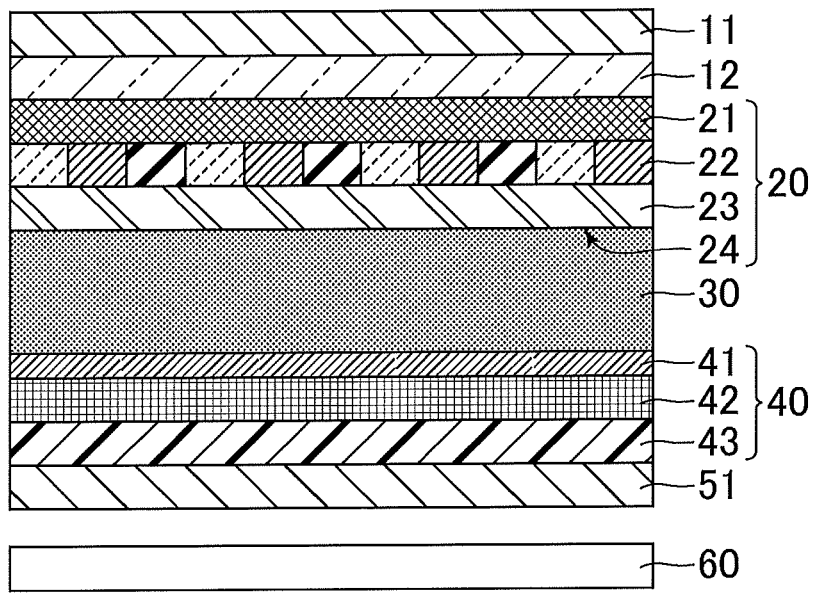
FIG. 1 is a schematic cross-sectional view of a liquid crystal display device according to Embodiment 1.
Figure 2:
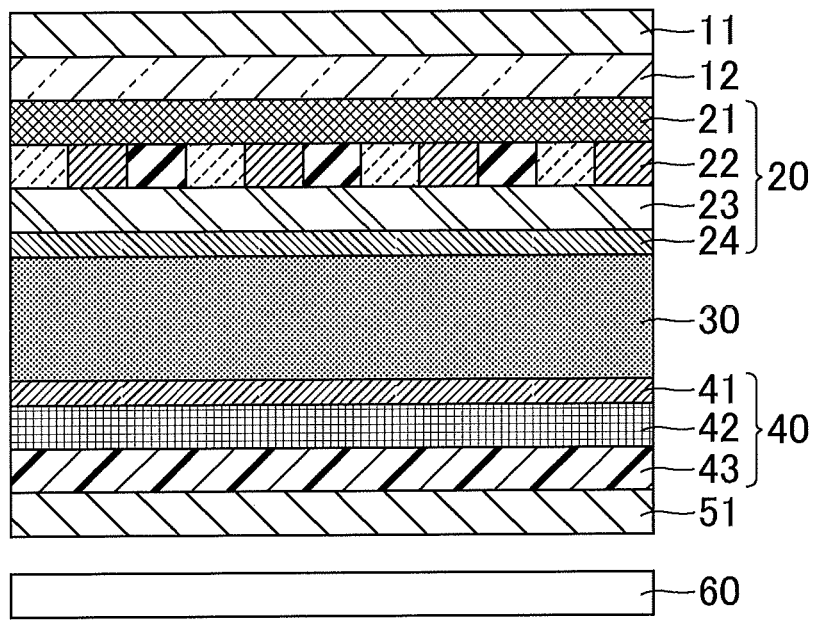
FIG. 2 is a schematic cross-sectional view of a liquid crystal display device according to a modification of Embodiment 1.

A liquid crystal display device and a retardation layer-forming monomer of Embodiment 1 will be described with reference to FIGS. 1 and 2. FIG. 1 is a schematic cross-sectional view of the liquid crystal display device according to Embodiment 1. FIG. 2 is a schematic cross-sectional view of a liquid crystal display device according to a modification of Embodiment 1. As shown in FIG. 1, the liquid crystal display device of the present embodiment includes a first linearly polarizing plate 11, an out-cell retardation layer 12, a color filter substrate (CF substrate) 20 which is one of a pair of substrates, a liquid crystal layer 30 containing a liquid crystal material, a TFT substrate 40 which is the other substrate, a second linearly polarizing plate 51, a backlight 60 in this order from the viewing side to the backside. The color filter substrate 20 and the TFT substrate 40 are pasted together by a sealing member (not shown) with a spacer (not shown), such as a photo spacer, interposed therebetween, and the liquid crystal layer 30 is provided between the color filter substrate 20 and the TFT substrate 40. Alignment layers 24 and 41 are provided on, respectively, a surface of the color filter substrate 20 on a side toward the liquid crystal layer 30 and a surface of the TFT substrate 40 on the liquid crystal layer 30 side so as to be in contact with the liquid crystal layer 30.

As the first linearly polarizing plate 11, polarizers (absorptive polarizing plate) obtained by dyeing and adsorbing an anisotropic material such as iodine complex (or dye) on a polyvinyl alcohol (PVA) film and then drawing and aligning the film can be used, for example. Typically, in order to ensure mechanical strength and moisture and heat resistance, a protective film such as a triacetyl cellulose (TAC) film is laminated on both sides of the PVA film before practical application.

As the out-cell retardation layer 12, a stretched polymer film generally used in the field of liquid crystal display devices may be used. Examples of the material of the polymer film include cycloolefin polymers, polycarbonates, polysulfones, polyether sulfones, polyethylene terephthalates, polyethylenes, polyvinyl alcohols, norbornenes, triacetylcelluloses, and diacetylcelluloses, among which cycloolefin polymers are preferred. A retardation layer formed of a cycloolefin polymer is excellent in durability, and has an advantage that a change in retardation is small when the retardation layer is exposed to a high temperature environment or a high temperature and high humidity environment for a long time of period. As a film of a cycloolefin polymer, "ZEONOR Film (registered trademark)" manufactured by Zeon Corporation, "ARTON (registered trademark) Film" manufactured by JSR Corporation, and the like are known.

The color filter substrate 20 includes a transparent base material 21 as a base material, a color filter/black matrix 22, an overcoat layer (not shown), and an in-cell retardation layer 23 in this order from the viewing side to the backside. Examples of the transparent base material 21 include a glass substrate and a plastic substrate.

The color filter/black matrix 22 has a configuration in which a red color filter, a green color filter and a blue color filter are arranged in a plane and partitioned by a black matrix. The red color filter, the green color filter, the blue color filter, and the black matrix are formed of, for example, a transparent resin containing a pigment. Usually, a combination of the red color filter, the green color filter and the blue color filter is disposed in all pixels, and a desired color is obtained at each pixel by mixing colors while controlling the amount of color light transmitted through the red color filter, the green color filter and the blue color filter.

The overcoat layer covers a surface of the color filter/black matrix 22 on a side toward the liquid crystal layer 30. By providing the overcoat layer, elution of impurities in the color filter/black matrix 22 into the liquid crystal layer 30 can be prevented. As a material of the overcoat layer, a transparent resin is suitable.

The in-cell retardation layer 23 is formed by polymerization of at least one monomer as a reactive mesogen (liquid crystalline monomer). In the present embodiment, the monomer itself forming the in-cell retardation layer 23 induces alignment. Specifically, the retardation layer-forming monomer according to Embodiment 1 (hereinafter also referred to as the monomer (1)) represented by the following Chemical formula (1) is used. The retardation of the in-cell retardation layer 23 is determined by a product of a birefringence Δn of a polymer formed by polymerization of at least one monomer and a thickness d of the in-cell retardation layer 23.

[Chem. 5]

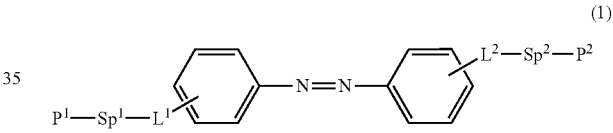

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

The monomer (1) has an azobenzene group that develops alignment upon irradiation with polarized light. Since the azobenzene group develops orientation by polarized light absorption, it is not necessary to form an alignment layer for aligning the monomer (1). When the in-cell retardation layer 23 is formed using the monomer (1), the monomer (1) itself induces alignment, so that, the entire in-cell retardation layer 23 is aligned. Therefore, alignment stability of the in-cell retardation layer 23 with respect to heat is improved, and a decrease in the orientation of the in-cell retardation layer 23 due to heat, that is, a decrease in retardation can be suppressed. Furthermore, since the orientation of the monomer and its polymer in the in-cell retardation layer 23 is improved, a decrease in contrast ratio due to scattering can be suppressed to a low level. As polarized light, polarized ultraviolet rays are suitable. Two or more monomers (1) may be used, or the monomer (1) may be used in combination with other monomers having no azobenzene group.

In the present embodiment, at least one monomer including the monomer (1) is irradiated with polarized light to form the in-cell retardation layer 23, and then the surface of the in-cell retardation layer 23 can be directly rubbed. Since the in-cell retardation layer 23 is aligned not only on the surface but in the entire thickness direction, even if the surface of the in-cell retardation layer 23 is rubbed, although the alignment of the liquid crystal layer 30 is induced, it is possible to prevent disturbance of the alignment of the in-cell retardation layer 23 and a decrease in retardation. As a result of the rubbing, as shown in FIG. 1, the surface of the in-cell retardation layer 23 functions as the alignment layer 24. The rubbing for inducing the alignment of the liquid crystal layer 30 is performed at an angle of, for example, 45° with respect to a slow axis of the in-cell retardation layer 23.

In order to further improve the orientation of the liquid crystal layer 30 and further improve the contrast ratio of the liquid crystal display device of the present embodiment, it is preferable to employ a photo-alignment treatment rather than direct rubbing of the surface of the in-cell retardation layer 23. When the photo-alignment treatment is performed, as shown in FIG. 2, the alignment layer 24 is separately formed on the in-cell retardation layer 23. In this case, the alignment layer 24 is preferably constituted of a photo-alignment film, and as a photo-alignment film material, from the viewpoint of a combination with the monomer (1) having an azobenzene group, a decomposable alignment film material having a photolytic functional group as a photofunctional group and a photo-alignment film material containing a cinnamate group as a photofunctional group are suitable. The reason is the following. The center (peak) of the light absorption wavelength of the azobenzene group is in the wavelength range of 380 to 390 nm, whereas the center (peak) of the light absorption wavelength of the photolytic functional group is up to around 250 nm, the center (peak) of the light absorption wavelength of the cinnamate group is up to 320 nm, and the light absorption wavelengths of the photofunctional group of the photo-alignment film and the monomer (1) do not overlap. On the other hand, when the light absorption wavelength of the azobenzene group of the monomer (1) overlaps with the light absorption wavelength of the photofunctional group of the photo-alignment film material, if unreacted functional groups remain in the monomer (1), the unreacted functional groups react due to a photo-alignment treatment, and the retardation of the in-cell retardation layer 23 may change. As the photolytic functional group, a cyclobutane ring is suitable.

Although a rubbing alignment film may be used as the alignment layer 24, in this case, alignment defects are likely to be generated, and the contrast ratio is lower than that in the case of using a photo-alignment film; therefore, the photo-alignment technique is preferably used as described above.

Specific examples of the monomer (1) include compounds represented by the following Chemical formulas (2-1) to (2-17).

[Chem. 6]

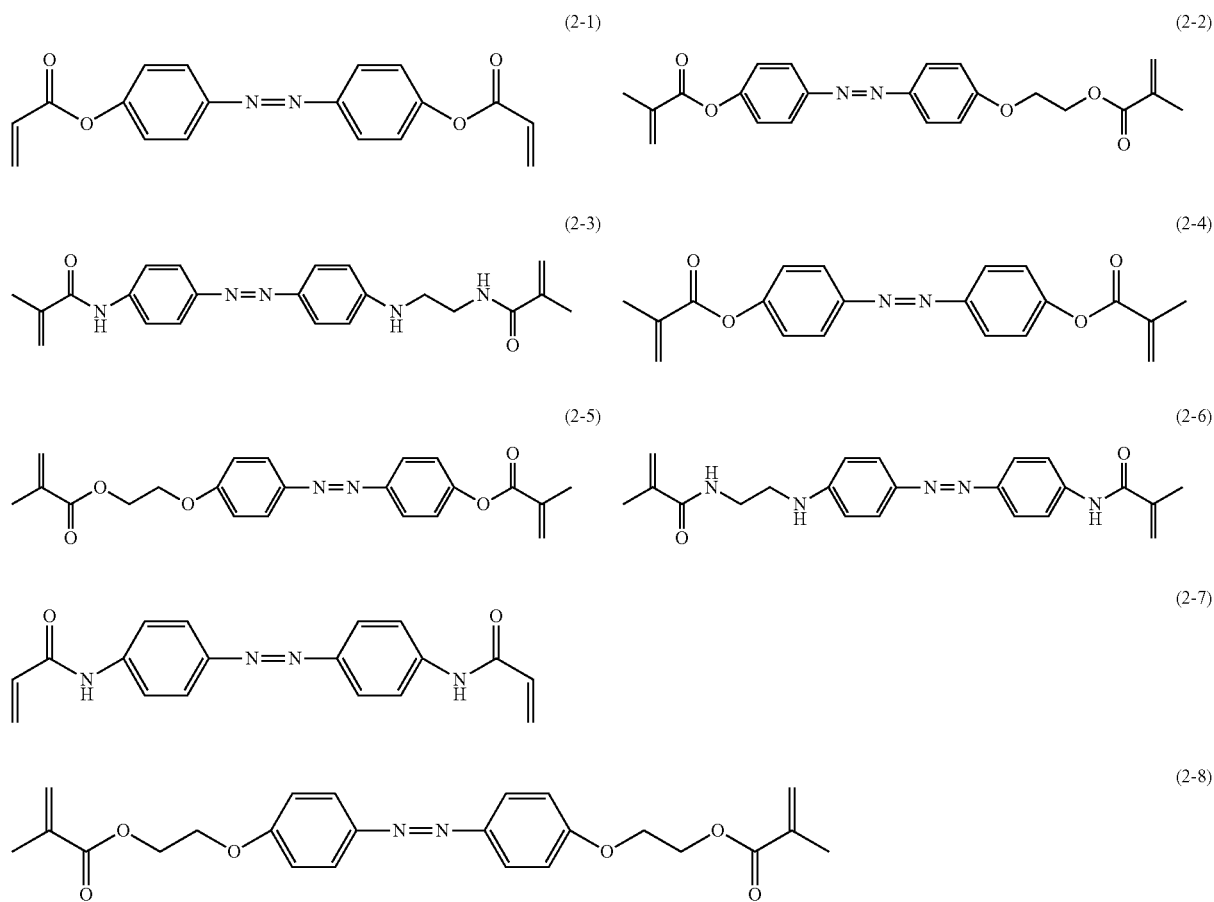

-continued

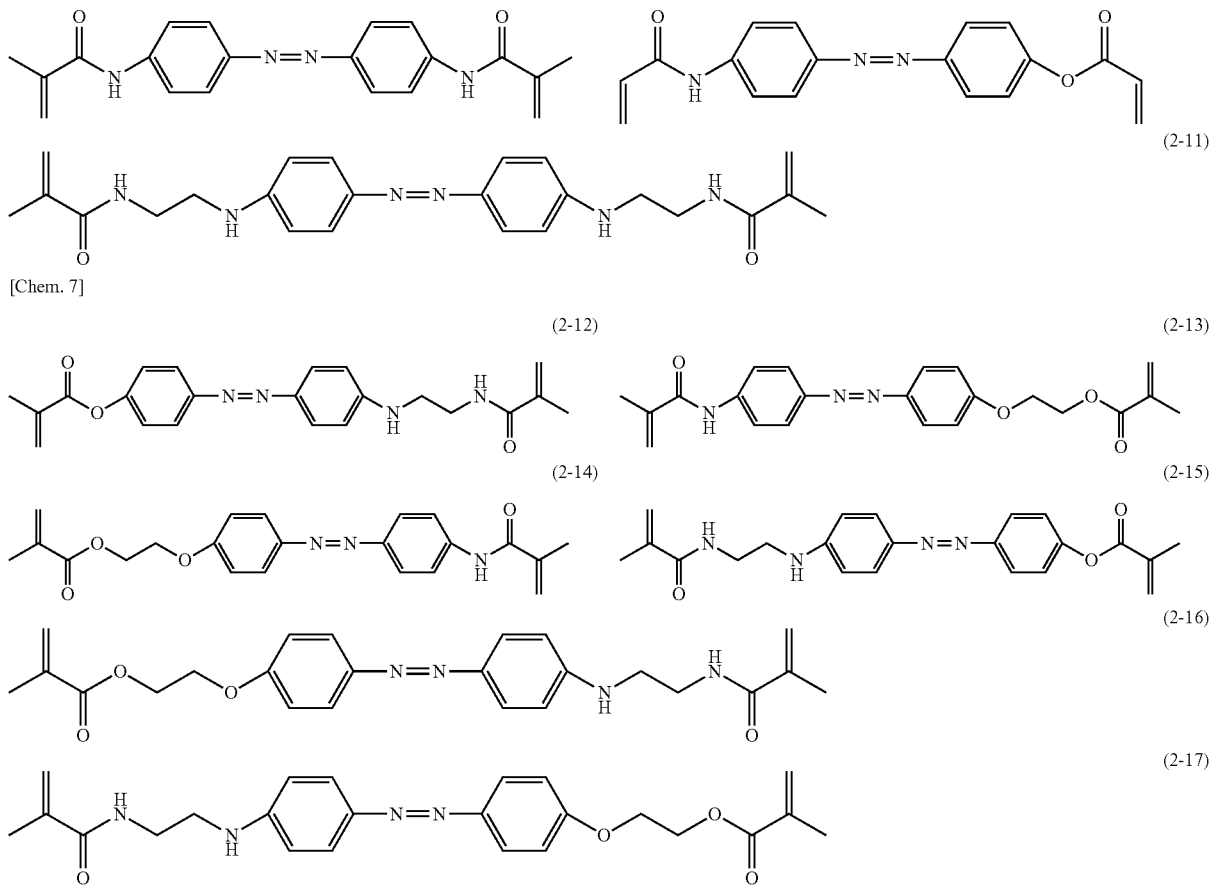

Figure 3:
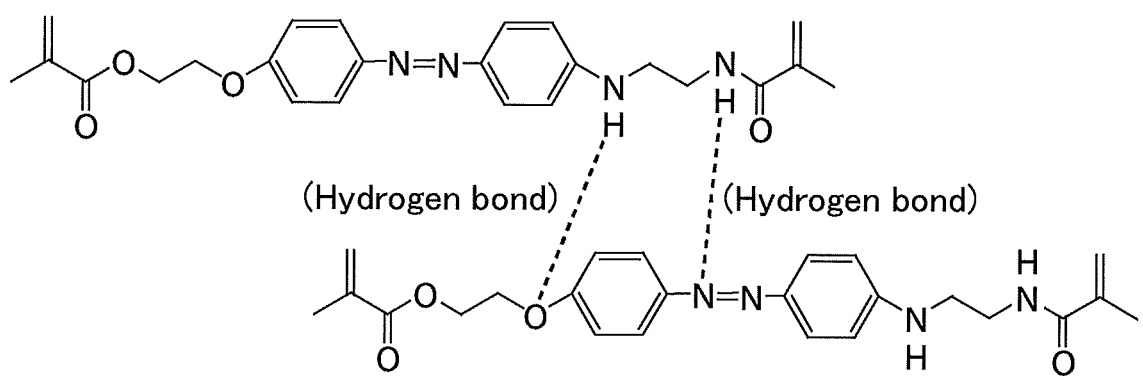
FIG. 3 is a chemical formula showing a state in which a monomer having an azobenzene group according to Embodiment 1 is hydrogen bonded.

Among them, the monomer (1) preferably contains at least one group of at least one of the —CONH— group or the —NH— group. As shown in FIG. 3, when the monomer (1) has an amino group (—NH— group) and/or an amide group (—CONH—) in the molecule, hydrogen bonds are induced between the molecules. Therefore, there are effects of improving the contrast ratio by further improving the orientation and improving reliability by improving thermal stability. Specific examples of the monomer (1) as described above include the compounds represented by Chemical formulas (2-3), (2-6), (2-7), or (2-9) to (2-17).

As functional groups bonded to the azobenzene group of the monomer (1), that is, $L^1$ and $L^2$, an amino group (—NH— group) or an oxy group (—O— group) is preferable, and in the monomer (1), an amino group (—NH— group) or an oxy group (—O— group) is preferably bonded to at least one of phenylene groups in the azobenzene group. Thus, radicals can be generated by a reaction mechanism represented by the following reaction formulas (A) and (B), and the monomer (1) can be polymerized without a polymerization initiator. That is, due to an influence of the azo group (—N=N—) in the azobenzene group, the electrons of the phenylene group (benzene ring) on both sides are biased. Therefore, cleavage occurs between the phenylene group to which the amino group or oxy group is directly bonded and the amino group or oxy group, and radicals are generated. Specific examples of the monomer (1) as described above include the compounds represented by Chemical formulas (2-1) to (2-17).

[Chem. 8]

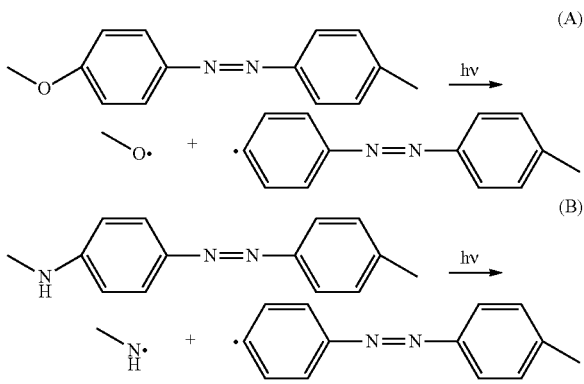

For the following reasons (i) and (ii), it is preferable to introduce an alkyl spacer (alkylene group, alkenylene group) between the azobenzene group of the monomer (1) and at least one of the polymerization group $P^1$ or $P^2$ which is a polymerization group.

(i) The orientation after polymerization of the monomer (1) further increases. However, the alkyl spacer preferably has 1 to 10 carbon atoms. When an alkyl group has 11 or more carbon atoms, an alkyl chain length is too long, resulting in a decrease in liquid crystal orientation. As the alkyl spacer, a straight-chain alkylene group having no unsaturated bond is preferable from the viewpoint of improving the orientation and improving the thermal stability as compared with an alkenylene group.

(ii) The polymerization of the monomer (1) tends to proceed. When the carbon number of the alkyl spacer is 0, that is, when there is no alkyl spacer, the monomer (1) has high molecular rigidity, and in a monomer state having a low fluidity, the polymerization of the monomer (1) hardly proceeds (propagation reaction is less likely to occur).

Thus, from the viewpoints of (i) and (ii), it is more preferable that at least one of $Sp^1$ or $Sp^2$ in Chemical formula (1) represent a linear alkylene group containing 1 to 6 carbon atoms. Specific examples of the monomer (1) as described above include the compounds represented by Chemical formulas (2-2), (2-3), (2-5), (2-6), (2-8), or (2-11) to (2-17).

The at least one monomer may further contain one or two or more second monomers different from the monomer represented by Chemical formula (1). Even in this case, the orientation (retardation) of the in-cell retardation layer 23 can be improved, and the retardation of the in-cell retardation layer 23 can be stabilized against temperature changes.

The second monomer may be a compound represented by any one of the following Chemical formulas (3-1) to (3-15).

[Chem. 9]

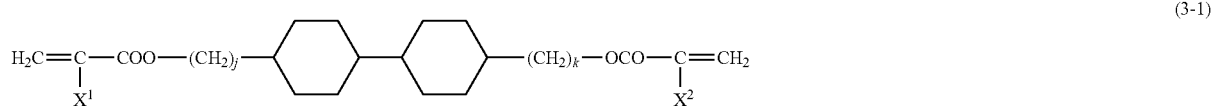

(3-1)

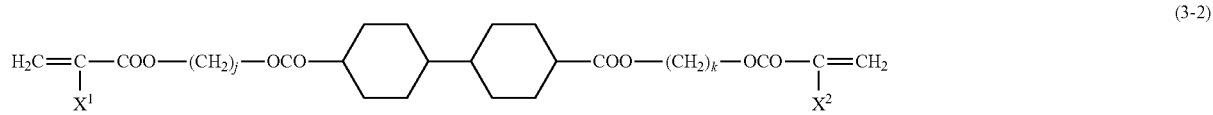

(3-2)

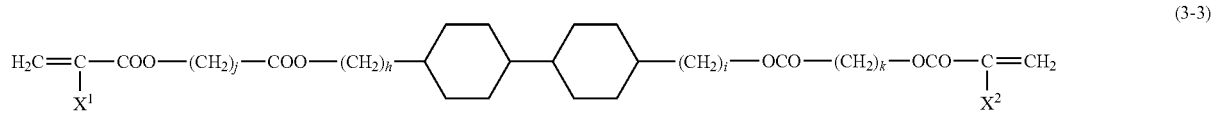

(3-3)

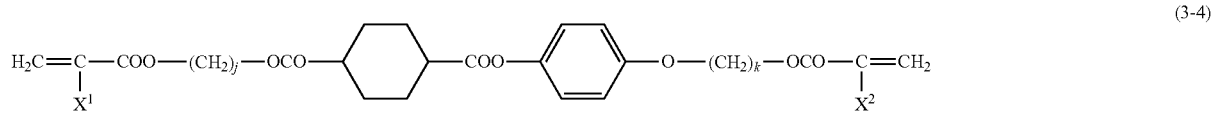

(3-4)

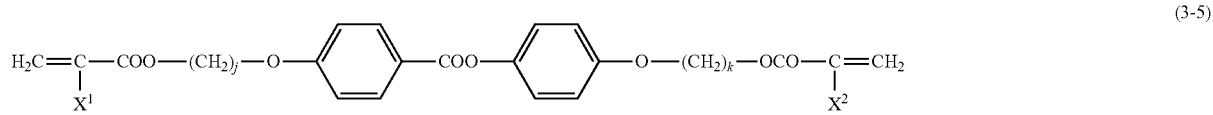

(3-5)

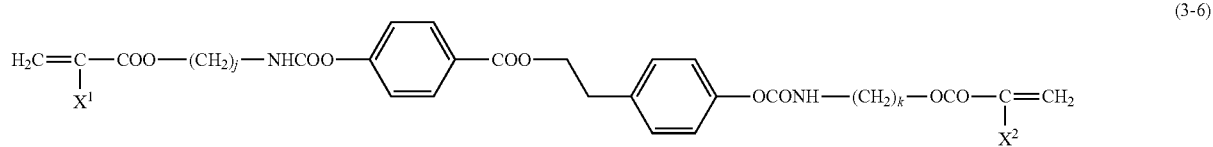

(3-6)

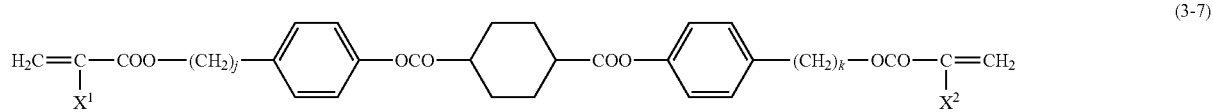

(3-7)

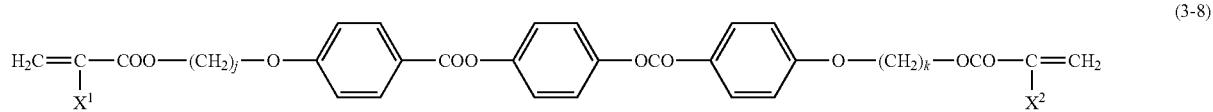

(3-8)

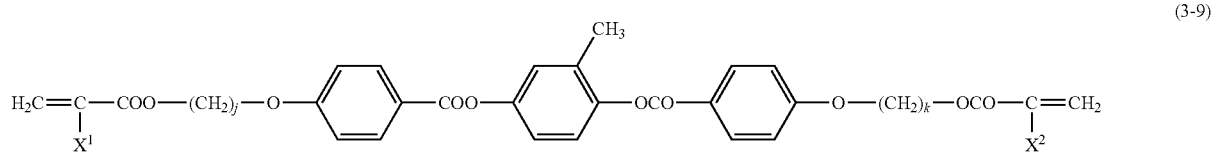

(3-9)

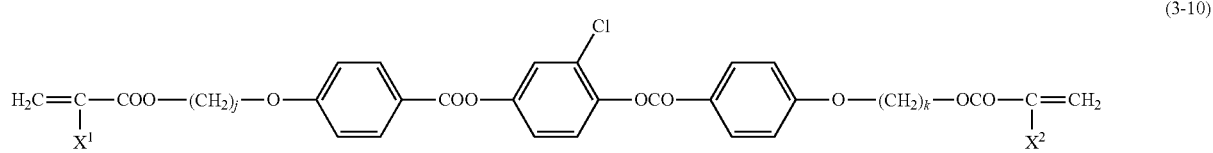

(3-10)

[Chem. 10]

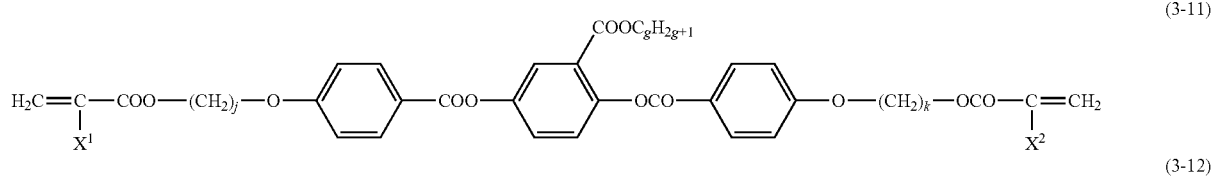
(3-11)

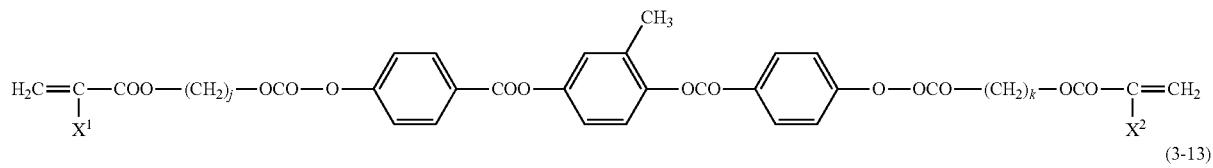
(3-12)

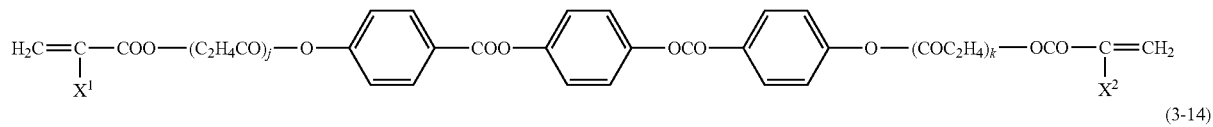
(3-13)

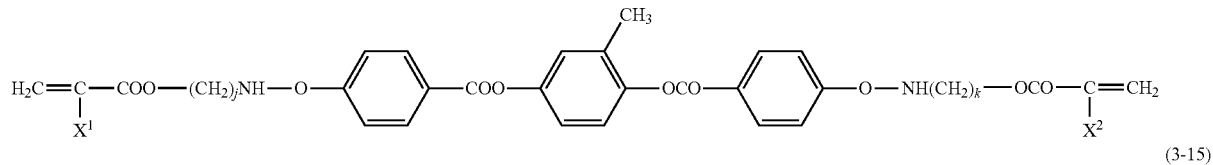
(3-14)

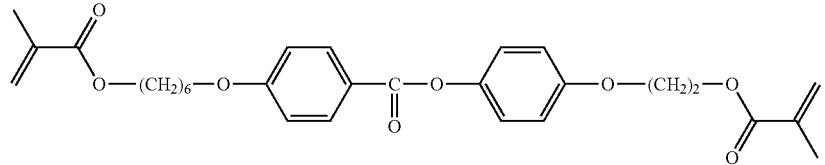
(3-15)

(wherein $X^1$ and $X^2$ are the same as or different from each other, and each represent a hydrogen atom or a methyl group. g, h and i are the same as or different from each other, and each represent an integer of 1 to 18.

j and k are the same as or different from each other, and each represent an integer of 1 to 12.)

The liquid crystal layer 30 is formed from a liquid crystal material. The liquid crystal material contains a liquid crystal that is horizontally aligned when no voltage is applied. The liquid crystal compound (liquid crystal molecule) in the liquid crystal layer 30 is horizontally aligned in a predetermined direction by a restraining force of the alignment layers 24 and 41 when no voltage is applied to electrodes provided on the TFT substrate 40 (during no voltage application). When a voltage is applied to the electrodes (during voltage application), the liquid crystal compound rotates in an in-plane direction according to a transverse electric field generated in the liquid crystal layer 30.

Unlike the reactive mesogen, as the liquid crystal material constituting the liquid crystal layer 30, the one having no polymerization group is generally used. The liquid crystal material is thermotropic liquid crystal, and is preferably, a liquid crystal material exhibiting a nematic phase (nematic liquid crystal). The liquid crystal material is preferably the one of which phase transits to the isotropic phase from the nematic phase at a certain critical temperature (nematic phase-isotropic phase transition point ($T_{NI}$)) or higher as the temperature is elevated. It is preferred that the liquid crystal layer 30 exhibits a nematic phase under a service environment (for example, −40° C. to 90° C.) of the liquid crystal display device. The temperature of the nematic phase-isotropic phase transition point of the liquid crystal material is not limited, and $T_{NI}$ of the liquid crystal material constituting the liquid crystal layer 30 is, for example, 70° C. to 110° C.

The at least one monomer is usually a solid (partially crystalline solid having an array structure) in a state where the monomer is not dissolved in a solvent. In a state where the monomer is dissolved in the solvent, the monomer molecules are aligned, and the monomer is in a so-called liquid crystal state (a state like a lyotropic liquid crystal). When a solution in which the monomer (1) is dissolved is heated, a phase transition is performed from the liquid crystal state to an isotropic phase state at, for example, 75° C. to 105° C.

The liquid crystal material constituting the liquid crystal layer 30 may have negative or positive value for the anisotropy of dielectric constant (Δε) defined by the formula below. In other words, the liquid crystal material constituting the liquid crystal layer 30 may have negative anisotropy of dielectric constant or positive anisotropy of dielectric constant. As the liquid crystal material having negative anisotropy of dielectric constant, for example, those having Δε of −1 to −20 can be used. As the liquid crystal material having positive anisotropy of dielectric constant, for example, those having Δε of 1 to 20 can be used. Further, the liquid crystal material constituting the liquid crystal layer 30 may contain a liquid crystal compound not having polarity, namely a liquid crystal compound having Δε of substantially 0 (neutral liquid crystal compound). Examples of the neutral liquid crystal compound include a liquid crystal compound having an alkene structure.

Δε=(dielectric constant in the major axis direction)−(dielectric constant in the minor axis direction)

From the viewpoint of maintaining a high VHR, the liquid crystal material constituting the liquid crystal layer 30 preferably has a positive anisotropy of dielectric constant. On the other hand, when the display mode of the liquid crystal display device of the present embodiment is a transverse electric field display mode, a good contrast ratio is obtained, so that the liquid crystal material constituting the liquid crystal layer 30 preferably has negative anisotropy of dielectric constant.

The TFT substrate 40 includes an alignment layer 41, a TFT layer 42, and a transparent base material 43 in order from the viewing side to the backside.

As the alignment layer 41, an alignment film usually used in the field of liquid crystal display devices can be used. Examples include a monolayer film or a multilayer film composed of at least one of polyimide, polyamic acid, polyamide, polymaleimide, polysiloxane, polysilsesquioxane, polyphosphazene, or a copolymer thereof, or a film of a silicon oxide formed by oblique deposition. The alignment layer 41 preferably undergoes an alignment treatment. The alignment treatment method is not limited, and a rubbing method, a photo-alignment method, or the like can be used.

The alignment layers 24 and 41 align the liquid crystal compound in the liquid crystal material in a direction horizontal to faces of the substrates 20 and 40. The alignment of the liquid crystal material during no voltage application is controlled by the alignment layers 24 and 41. Aligning the liquid crystal compound in the liquid crystal material in the direction horizontal to face of the substrate means that a pre-tilt angle of the liquid crystal material with respect to the faces of the substrates 20 and 40 is 10° or less. It is more preferred that the pre-tilt angle is 3° or less. The pre-tilt angle refers to an angle formed by a long axis of the liquid crystal material (liquid crystal compound) with respect to a face of substrate at an applied voltage to the liquid crystal layer 30 of less than the threshold voltage (including no application of voltage), and a face of substrate is 0°, and a normal of substrate is 90°.

The TFT layer 42 is a layer including at least a TFT, which is a switching element used to switch on/off of a pixel of the liquid crystal display device, and includes wirings and electrodes connected to the TFT, insulating films to electrically separate the wirings and the electrodes, and the like. As a liquid crystal drive mode of the liquid crystal display device of the present embodiment, a horizontal alignment mode such as a fringe field switching (FFS) mode or an in-plane switching (IPS) mode is used.

In the horizontal alignment mode, a pair of electrodes that generate a transverse electric field in the liquid crystal layer 30 by applying voltage is used. In the FFS mode, the TFT substrate 40 includes a common electrode (planar electrode), an insulating film covering the common electrode, and a pixel electrode (comb electrode or slit electrode) disposed on the surface of the insulating film on a side toward the liquid crystal layer 30. According to such a configuration, a transverse electric field (fringe electric field) can be generated in the liquid crystal layer 30 by applying voltage between the common electrode and the pixel electrode constituting the pair of electrodes. Thus, the alignment of the liquid crystal molecules in the liquid crystal layer 30 can be controlled by adjusting the voltage applied between the common electrode and the pixel electrode.

Examples of the material of the common electrode and the pixel electrode include indium tin oxide (ITO) and indium zinc oxide (IZO). Examples of the material of the insulating film include an organic insulating film and a nitride film.

In the IPS mode, a transverse electric field is generated in the liquid crystal layer 30 by applying voltage to a pair of comb electrodes, and the alignment of the liquid crystal molecules in the liquid crystal layer 30 can be controlled. Any horizontal alignment mode is driven as a transverse electric field display mode.

Examples of the transparent base material 43 include a glass substrate and a plastic substrate.

As the second linearly polarizing plate 51, the same one as the first linearly polarizing plate 11 can be used.

A transmission axis of the first linearly polarizing plate 11 and a transmission axis of the second linearly polarizing plate 51 are preferably orthogonal to each other. According to such a configuration, since the first linearly polarizing plate 11 and the second linearly polarizing plate 51 are arranged in a crossed Nicols relationship, a good black display state can be realized during no voltage application. In the following description, the direction of the transmission axis of the second linearly polarizing plate 51 is defined as 0°. At this time, the direction of the transmission axis of the first linearly polarizing plate 11 is preferably 90°.

In the present specification, two axes (directions) being orthogonal to each other indicates that an angle (absolute value) formed by the two axes is within a range of 90±3° unless otherwise noted, and the angle is preferably within a range of 90±1°, more preferably 90±0.5°, particularly preferably 90° (perfectly orthogonal).

The out-cell retardation layer 12 is preferably a retardation layer (λ/4 plate) that imparts an in-plane retardation of ¼ wavelength to light having a wavelength of at least 550 nm, and specifically preferably a retardation layer that imparts an in-plane retardation of 100 nm or more and 176 nm or less to the light having a wavelength of at least 550 nm. When the out-cell retardation layer 12 functions as a λ/4 plate, this can function a combination of the first linearly polarizing plate 11 and the out-cell retardation layer 12 as a circular polarizing plate. Thereby, internal reflection of the liquid crystal display panel can be reduced, so that a good black display in which the reflection (projection) of external light is suppressed can be realized.

In circularly polarized FFS mode liquid crystal in which only the out-cell retardation layer 12 is incorporated into FFS mode liquid crystal, black display cannot be performed. Therefore, by further providing the in-cell retardation layer 23, the performance of the circularly polarized FFS mode liquid crystal can be improved. It is preferable that the in-plane slow axis of the out-cell retardation layer 12 and the in-plane slow axis of the in-cell retardation layer 23 be orthogonal to each other and a retardation value of the out-cell retardation layer 12 and a retardation value of the in-cell retardation layer 23 be equal to each other. Thereby, the out-cell retardation layer 12 and the in-cell retardation layer 23 can cancel the retardation each other with respect to light incident from the normal direction of the liquid crystal display panel, and a state in which both of them substantially do not exist optically is realized. That is, a configuration is realized that is optically equivalent to a conventional liquid crystal display panel in a transverse electric field mode with respect to light entering the liquid crystal display panel from the backlight 60. Thus, display in a transverse electric field mode using a circular polarizing plate can be realized. Thus, the in-cell retardation layer 23 is preferably a retardation layer (λ/4 plate) that imparts an in-plane retardation of ¼ wavelength to light having a wavelength of at least 550 nm, and specifically preferably a retardation layer that imparts an in-plane retardation of 100 nm or more and 176 nm or less to the light having a wavelength of at least 550 nm.

From the viewpoint of developing functions of the retardation layer, the in-plane slow axis of the out-cell retardation layer 12 and the in-plane slow axis of the in-cell retardation layer 23 preferably form an angle of 45° with respect to the transmission axis of the first linearly polarizing plate 11 and the transmission axis of the second linearly polarizing plate 51. That is, it is preferable that one of the in-plane slow axis of the out-cell retardation layer 12 and the in-plane slow axis of the in-cell retardation layer 23 have an azimuth of 45° and the other have an azimuth of 135°.

In the present specification, two axes (directions) forming an angle of 45° indicates that an angle (absolute value) formed by the two axes is within a range of 45±3° unless otherwise noted, and the angle is preferably within a range of 45±1°, more preferably 45±0.5°, particularly preferably 45° (perfectly 45°).

As a preferred arrangement of the optical axis in the present embodiment, for example, when the azimuth of the transmission axis of the second linearly polarizing plate 51 is 0°, the in-plane slow axis of the in-cell retardation layer 23 is 45° azimuth, the initial alignment azimuth of the liquid crystal material of the liquid crystal layer 30 is 0° or 90°, the in-plane slow axis of the out-cell retardation layer 12 is −45° azimuth, and the azimuth of the transmission axis of the first linearly polarizing plate 11 is 90°.

As a material for a photo spacer, a photosensitive resin is preferably used because it can be patterned by photolithography.

The sealing member is disposed to surround the periphery of the liquid crystal layer 30 in a plan view. The sealing member may be cured by light such as ultraviolet rays, or may be cured by heat, or may be cured by both light and heat. The sealing member may contain an epoxy resin or a (meth)acryl resin, for example. The sealing member may contain an inorganic filler, an organic filler or a curing agent. As the sealing member, for example, Photolec available from Sekisui Chemical Co., Ltd. may be used.

The backlight 60 may be of any type such as an edge-lit backlight or a direct-lit backlight. A light source of the backlight 60 may be of any type such as light emitting diodes (LEDs) or cold cathode fluorescent lamps (CCFLs). The amount of light emitted from the backlight 60 and transmitted through the liquid crystal display panel is controlled by the voltage applied to the liquid crystal layer 30 provided in the liquid crystal display panel.

The liquid crystal display device of Embodiment 1 may include other components. For example, by providing an antireflection film on the viewing side of the first linearly polarizing plate 11, the reflectance of the liquid crystal display panel can be further reduced. As the antireflection film, a moth-eye film having a moth-eye surface structure is preferably used.

In the present embodiment, the case Where the in-cell retardation layer 23 is disposed between the out-cell retardation layer 12 and the liquid crystal layer 30 and applied to the transverse electric field mode using a circularly polarizing plate is described in detail. The use of the in-cell retardation layer according to the present embodiment is not limited, and the in-cell retardation layer may be used for a liquid crystal display device other than the transverse electric field mode using a circularly polarizing plate. For example, an in-cell retardation layer in which the presence or absence of a retardation function is patterned may be provided in a transflective liquid crystal display device so that a retardation is imparted to a reflective portion and no retardation is imparted to a transparent portion. The patterning of the retardation function can be realized, for example, by using a photomask, irradiating the reflective portion with polarized light, and irradiating the transparent portion with unpolarized light. The arrangement of the in-cell retardation layer according to the present embodiment is not limited as long as the in-cell retardation layer is disposed between the base materials of the pair of substrates. Depending on the application, the in-cell retardation layer may be provided on each of the color filter substrate 20 and the TFT substrate 40, for example or may' be provided only on the TFT substrate 40.

In the present embodiment, the case where the liquid crystal drive mode of the liquid crystal display device of the present embodiment is the horizontal alignment mode is further described in detail. The liquid crystal drive mode according to the present embodiment is not limited and may be a vertical alignment mode, and the alignment layers 24 and 41 may align the liquid crystal compound in the liquid crystal material in a direction substantially vertical to the faces of the substrates 20 and 40. However, when the surface of the in-cell retardation layer 23 is rubbed directly and formed into the alignment layer 24, the alignment layer 24 is preferably the one which aligns the liquid crystal compound in the liquid crystal material in the direction horizontal to the faces of the substrates 20 and 40.

Production Method for Liquid Crystal Display Device of Embodiment 1

A production method for a liquid crystal display device of Embodiment 1 is described. The production method for a liquid crystal display device of Embodiment 1 includes a monomer layer forming step, an in-cell retardation layer forming step, and an alignment layer forming step. Hereinafter, while the steps are described in more detail, the members and the monomer material are as described above, and thus the description thereof is omitted.

Figure 4:
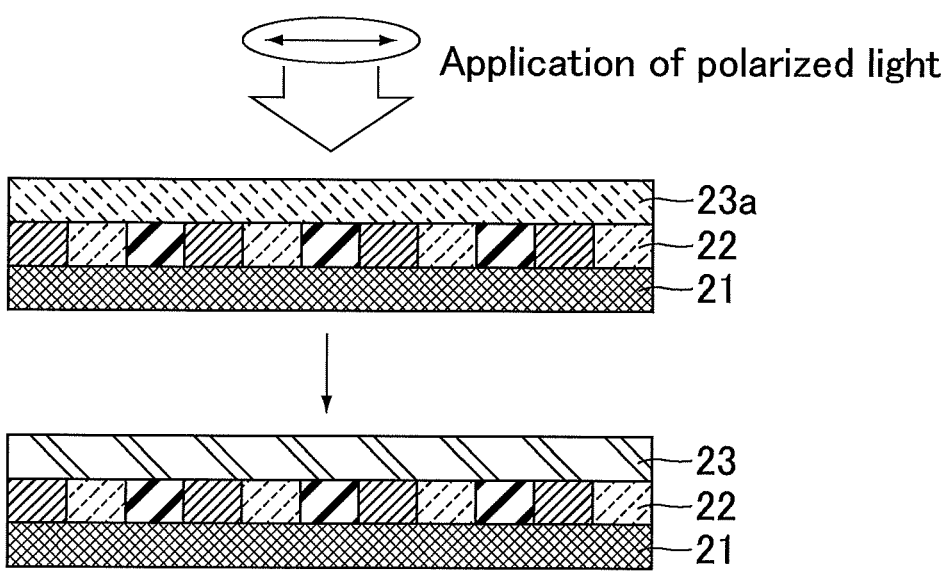
FIG. 4 is a schematic view for explaining a formation process of an in-cell retardation layer in a production method for the liquid crystal display device of Embodiment 1.

FIG. 4 is a schematic view for explaining a formation process of an in-cell retardation layer in the production method for the liquid crystal display device of Embodiment 1. As shown in FIG. 4, in the monomer layer forming step, a solution containing at least one monomer including the monomer (monomer (1)) represented by Chemical formula (1) is applied on at least one of the pair of substrates, that is, at least one of the color filter substrate 20 or the TFT substrate 40, to form a monomer layer 23*a*. The at least one monomer may further contain a second monomer different from the monomer (1).

Examples of the solvent used in the above solution include propylene glycol monomethyl ether acetate (PEG-MEA), toluene, chloroform, and tetrahydrofuran (THF).

A content of the monomer (1) with respect to the solution may be 0.01% by weight or more and 50% by weight or less, 0.1% by weight or more and 30% by weight or less, or 1% by weight or more and 15% by weight or less. A content of the second monomer with respect to the solution may be 0.01% by weight or more and 70% by weight or less, 0.1% by weight or more and 40% by weight or less, or 1% by weight or more and 20% by weight or less. The mixing ratio of the monomer (1) and the second monomer may be 1:0 to 1:20, 1:1 to 1:10, or 1:2 to 1:5 by weight ratio.

As a method of applying the solution described above, any method generally known in the relevant field may be used. For example, the method includes a spin coating method, a bar coating method, a die coater method, a screen printing method, and a spray coater method.

In the monomer layer forming step, it is preferable to perform heat treatment at 80° C. to 150° C. for 1 to 30 minutes after the application of the solution in order to remove the solvent in the solution (temporary baking step).

In the in-cell retardation layer forming step, as shown in FIG. 4, the in-cell retardation layer 23 is formed by irradiating the monomer layer 23a with polarized light and polymerizing and aligning at least one monomer. The irradiation with polarized light polymerizes a monomer to form a polymer and, at the same time, reacts (for example, isomerizes) a photoreactive group such as an azobenzene group to align the monomer and polymer, and the retardation is imparted to the in-cell retardation layer 23. Furthermore, the irradiation with polarized light forms the slow axis of the in-cell retardation layer 23 in a direction that forms 90±2° (preferably 90±1°, more preferably 90°) with respect to the polarization axis direction of the polarized light.

The polarized light in the in-cell retardation layer forming step is preferably polarized ultraviolet rays, and the wavelength of the polarized ultraviolet rays is preferably 250 nm or more and 450 nm or less. The dose of the polarized ultraviolet rays may be 0.3 J/cm$^2$ or more and 20 J/cm$^2$ or less. A more preferred lower limit of the dose is 1 J/cm$^2$, and a more preferred upper limit is 5 J/cm$^2$. The polarized ultraviolet rays are more preferably linearly polarized ultraviolet rays.

In the in-cell retardation layer forming step, the monomer layer may be irradiated with polarized light while the monomer layer is heated. This makes it possible to increase a formation speed of the in-cell retardation layer (it is possible to irradiate polarized light with a low amount of irradiation). The temperature at which the monomer layer is heated may be, for example, 60° C. to 90° C. It is possible to form an in-cell retardation layer by irradiating a monomer layer with polarized light without heating the monomer layer as in the examples described later. In this case, it is preferable to irradiate polarized light with a relatively high amount of irradiation, and preferably, the in-cell retardation layer is formed only from the monomer (1), or a concentration ratio of the monomer (1) to the second monomer is increased, for example, set to obtain the mixing ratio described above.

In the in-cell retardation layer forming step, after irradiation with polarized light, in order to completely remove the solvent in the in-cell retardation layer and to cure the in-cell retardation layer, it is preferable to perform heat treatment at 80° C. to 150° C. for 1 to 30 minutes (main baking step). Thereby, when there is an unreacted (unpolymerized) functional group, it is possible to further advance the polymerization of a monomer thereof, and as a result, the in-cell retardation layer has a specific (final) retardation.

The film thickness of the in-cell retardation layer after the main baking step may be 0.1 μm or more and 10 μm or less.

In the alignment layer forming step, an alignment layer which aligns the liquid crystal compound in the liquid crystal material on at least one of the color filter substrate or the TFT substrate is formed. Preferably, an alignment layer which aligns the liquid crystal compound in the liquid crystal material in the direction horizontal to face of the substrate is formed.

The alignment layer forming step preferably includes (A) a step of rubbing the surface of the in-cell retardation layer, or (B) a step of forming a polymer film which contains a polymer on the in-cell retardation layer, and a step of irradiating the polymer film with polarized light.

When the step (A) is performed, the surface of the in-cell retardation layer functions as an alignment layer. Rubbing can be performed at an angle of 5° to 175° with respect to the slow axis of the in-cell retardation layer. Although other conditions can be set in the same manner as in the case of a general photo-alignment film, the thickness of the in-cell retardation layer after the baking step is preferably large so that the in-cell retardation layer does not impair the retardation even when the in-cell retardation layer surface is rubbed. Specifically, the thickness is preferably 1 μm or more, more preferably 3 μm or more.

The step (B) can use a general method for forming a photo-alignment film. For example, after a liquid crystal aligning agent containing a polymer and a solvent is applied on the in-cell retardation layer, baking is performed to form a polymer film. Thereafter, the polymer film is irradiated with polarized light as an alignment treatment. As a result of the step (B), a photo-alignment film as the alignment layer is formed on the in-cell retardation layer.

As the polymer in the step (B), a polymer having a photoreactive group is used, and a polymer containing a cinnamate group or a cyclobutane ring is particularly preferable. Examples of the polymer film in the step (B) include a monolayer film or a multilayer film composed of at least one of polyimide, polyamic acid, polyamide, polymaleimide, polysiloxane, polysilsesquioxane, polyphosphazene, or a copolymer thereof.

As a method of applying the liquid crystal aligning agent described above, any method generally known in the relevant field may be used. For example, the method includes a spin coating method, a bar coating method, a die coater method, a screen printing method, and a spray coater method.

As a solvent for the liquid crystal aligning agent, any solvent generally known in the relevant field may be used.

The polarized light in the step (B) is preferably polarized ultraviolet rays. When a polymer containing a cinnamate group is used, the wavelength of the polarized ultraviolet rays is preferably 270 nm or more and 350 nm or less. When a polymer containing a cyclobutane ring is used, the wavelength of the polarized ultraviolet rays is preferably 240 nm or more and 320 nm or less. The dose of the polarized ultraviolet rays may be 0.005 J/cm$^2$ or more and 10 J/cm$^2$ or less. A more preferred lower limit of the dose is 0.02 J/cm$^2$, and a more preferred upper limit is 5 J/cm$^2$. The polarized ultraviolet rays are more preferably linearly polarized ultraviolet rays. The linearly polarized ultraviolet rays can be irradiated such that the polarization axis direction is at an angle of 5° to 175° with respect to the slow axis of the in-cell retardation layer. Other alignment treatment conditions can be set in the same manner as in the case of a general photo-alignment film.

The alignment layer forming step may include a step of forming a general rubbing alignment film and a step of rubbing the alignment film surface instead of the step (B). As described above, it is preferable to include the step (B) from the viewpoint of improving the contrast ratio.

A step of forming an alignment layer on a substrate on which the in-cell retardation layer is not formed can use a general method for forming an alignment film. For example, a liquid crystal aligning agent containing one or more of polyimide, polyamic acid, polyamide, polymaleimide, polysiloxane, polysilsesquioxane, polyphosphazene, or a copolymer thereof is applied on the TFT substrate, and then heated and dried to form a polymer film (a monolayer film or a multilayer film). Thereafter, the polymer film undergoes an alignment treatment as necessary. The alignment treatment method is not limited, and a rubbing method, a photo-alignment method, or the like can be used. In addition, a step of forming an alignment layer of the TFT substrate may be, for example, a step of forming a film of a silicon oxide formed by oblique deposition.

When the alignment layer is formed on each of the color filter substrate and the TFT substrate, the alignment treatment may be performed such that directions where the alignment layers of both the substrates align the liquid crystal compound are parallel to each other.

After the alignment layer forming step, for example, a liquid crystal material is sealed between a pair of color filter substrates and a TFT substrate to form a liquid crystal layer.

The liquid crystal layer can be formed by filling the space between the pair of color filter substrates and the TFT substrate with the liquid crystal composition, for example, by vacuum injection or one drop filling. When the vacuum injection is employed, a liquid crystal layer is formed by conducting application of the sealing member, pasting together of the pair of substrates, curing of the sealing member, injection of the liquid crystal composition, and sealing of the injection port in this order. When the one drop filling is employed, a liquid crystal layer is formed by conducting application of the sealing member, dropping of the liquid crystal composition, pasting together of the pair of substrates, and curing of the sealing member in this order.

The above steps are followed by the step of pasting a polarizing plate, and the step of attaching a controlling unit, a power unit, a backlight and so on to complete the liquid crystal display device of Embodiment 1.

When the liquid crystal display device is in a normally black mode, for example, a pair of polarizing plates are arranged on the outer sides of the pair of color filter substrates and the TFT substrate in a crossed Nicols relationship so that the absorption axes intersect each other at right angles, and the polarizing plates are arranged so that the absorption axis of the polarizing plates and the initial alignment azimuth of the liquid crystal material form an angle of 0° or 90°. In the condition that a voltage of a threshold or higher is not applied to the liquid crystal layer, the light from the backlight fails to transmit through the liquid crystal layer to give a black state. As a voltage of a threshold or higher is applied to the liquid crystal layer, the angle formed by the absorption axis of the pair of polarizing plates arranged in a crossed Nicols relationship, and the alignment azimuth of the liquid crystal material becomes, for example, 45°, so that the light from the backlight transmits through the liquid crystal layer to give a white state.

Each and every detail described for Embodiments of the present invention shall be applied to all the aspects of the present invention.

The present invention is described below in more detail based on examples and comparative examples. The examples, however, are not intended to limit the scope of the present invention.

Example 1-1

(Formation of in-Cell Retardation Layer on CF Substrate)

First, as a reactive mesogenic material, a solution in which 10% by weight of a monomer represented by the following Chemical formula (2-8) was dissolved was prepared. Propylene glycol monomethyl ether acetate (PEG-MEA) was used as a solvent. Subsequently, the solution was applied on a CF substrate using a spin coater, and temporarily baked for 1 minute on a 140° C. hot plate. Then, a principal surface of the CF substrate was irradiated with 1 J/cm$^2$ of linearly polarized ultraviolet rays centered at 365 nm from the normal direction to polymerize a reactive mesogen simultaneously with the alignment treatment. The linearly polarized ultraviolet rays were irradiated such that the polarization axis direction was at an angle of 90° with respect to a desired slow axis direction of the in-cell retardation layer. Finally, main baking was performed at 180° C. for 30 minutes to completely remove the solvent and to cure the in-cell retardation layer. After the main baking step, the thickness of the in-cell retardation layer was 1 mm, and the retardation was 135 nm.

[Chem. 11]

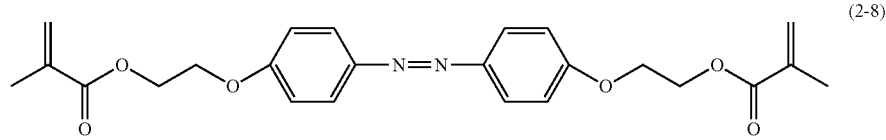

(2-8)

(Step of Producing Liquid Crystal Display Device)

A liquid crystal panel in FFS mode was actually prepared in the following manner. First, a TFT substrate in which a pixel electrode having an FFS electrode structure made of indium tin oxide (ITO), an insulating film and a common electrode are laminated, and the CF substrate described above not having an electrode but having an in-cell retardation layer were prepared. Subsequently, a polyimide-based alignment film for rubbing was formed only on the TFT substrate. The polyimide-based alignment film means an alignment film containing polyimide. Subsequently, rubbing treatment was applied to both the polyimide-based alignment film of the TFT substrate and an in-cell retardation film of the CF substrate so that alignment in an antiparallel relationship was achieved. That is, the rubbing treatment was applied in parallel and opposite directions in the state that the TFT substrate and the CF substrate pasted together. The rubbing treatment was performed in a direction forming 45° (45° instead of 45±3°) with respect to the slow axis of the in-cell retardation layer. Subsequently, a sealing member was drawn on the TFT substrate. As the sealing member, a sealing member which is of a type that is cured by both ultraviolet rays and heat was used. Subsequently, a liquid crystal material having positive anisotropy of dielectric constant ($T_{NI}$ is 90° C.) was added dropwise onto the TFT substrate, and a CF substrate having an in-cell retardation layer was pasted. Subsequently, a realignment treatment was performed, provided that the temperature of the liquid crystal cell was defined as $T_{NI}$ or higher (100° C.), so that a liquid crystal cell in FFS mode having an in-cell retardation layer in the cell was completed.

Example 1-2

A liquid crystal cell in FFS mode of Example 1-2 was produced in the same manner as in Example 1-1 except that a solution (solvent: PEGMEA) in which 10% by weight of a monomer represented by the following Chemical formula (2-11) was dissolved was used as a reactive mesogenic material.

[Chem. 12]

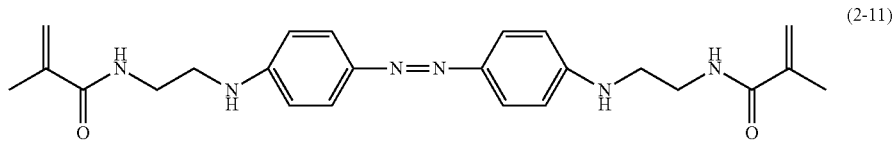

(2-11)

Example 1-3

A liquid crystal cell in FFS mode of Example 1-3 was produced in the same manner as in Example 1-1 except that a solution (solvent: PEGMEA) in which 10% by weight of a monomer represented by the following Chemical formula (2-17) was dissolved was used as a reactive mesogenic material.

[Chem. 13]

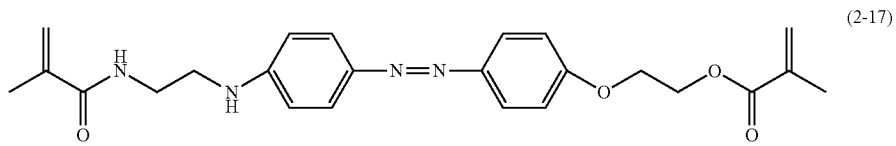

(2-17)

Comparative Example 1-1

A liquid crystal cell in FFS mode of Comparative Example 1-1 was produced in the same manner as in Example 1-1 except that the step of forming in-cell retardation was different. In this comparative example, first, a polyimide-based alignment film for rubbing was formed on a CF substrate and subjected to rubbing treatment. Thereafter, a solution (solvent: PEGMEA) in which 10% by weight of a monomer represented by the following Chemical formula (3-15) and serving as a reactive mesogenic material was dissolved was applied. Then, temporary baking, polymerization by irradiation with non-polarized ultraviolet rays, and main baking were performed to form in-cell retardation. After the main baking step, the thickness of the in-cell retardation was 1 mm, and the retardation was 135 nm.

[Chem. 14]

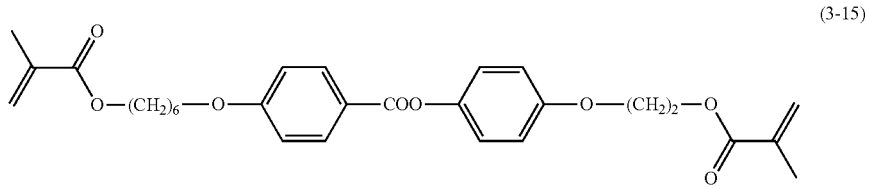

(3-15)

Comparative Example 1-2

A liquid crystal cell in FFS mode of Comparative Example 1-2 was produced in the same manner as in Example 1-1 except that in-cell retardation was not formed on a CF substrate. The liquid crystal cell of this comparative example was produced using the same material as in Example 1-1, except that the CF substrate did not have an in-cell retardation layer.

Comparative Example 1-3

A liquid crystal cell in FFS mode of Comparative Example 1-3 was produced in the same manner as in Example 1-1 except that a solution (solvent: PEGMEA) in which 10% by weight of a monomer represented by the following Chemical formula (4) was dissolved was used as a reactive mesogenic material.

[Chem. 15]

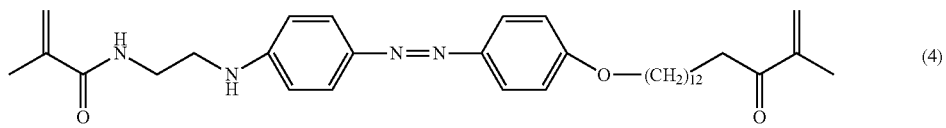

(4)

<Evaluation Test>

The results of the following evaluation tests are shown in Table 1 below.

(Heat Resistance Test for in-Cell Retardation)

A heat resistance test for in-cell retardation was performed. Specifically, the retardation before and after baking for 30 minutes on a 200° C. hot plate was measured. The retardation was measured by ellipsometry.

(Dark Room Contrast Ratio of Liquid Crystal Display Device)

The dark room contrast ratio of the produced liquid crystal display device was measured in a dark room by using a color luminance meter (BM5 available from TOPCON TECHNOHOUSE CORPORATION).

(Outdoor Visibility Test of Liquid Crystal Display Devices)

The outdoor visibility test of the produced liquid crystal display device was performed under sunlight by subjective evaluation.

TABLE 1

|  | | Retardation of in-cell retardation layer (nm) | | Liquid crystal display device | |
| --- | --- | --- | --- | --- | --- |
|  | Reactive mesogen | Before heating | After heating (30 min) | Contrast ratio | Outdoor visibility |
| Example 1-1 | (2-8) | 135 | 130 | 622 | Good |
| Example 1-2 | (2-11) | 135 | 135 | 632 | Good |
| Example 1-3 | (2-17) | 135 | 135 | 632 | Good |
| Comparative Example 1-1 | (3-15) | 135 | 105 | 480 | Good |
| Comparative Example 1-2 | — | — | — | 800 | Poor |
| Comparative Example 1-3 | (4) | 120 | 115 | 515 | Good |

For in-cell retardation layers formed using reactive mesogen, in the in-cell retardation layers produced using the monomers represented by Chemical formula (2-8), (2-11) or (2-17), there was no decrease in retardation even after heat treatment at 200° C. for 30 minutes. On the other hand, when an in-cell retardation layer having Chemical formula (3-15) was formed on a polyimide-based alignment film, the retardation decreased. In Examples 1-1 to 1-3, the reactive mesogen itself absorbs polarized ultraviolet rays and exhibits the orientation, so that it is considered that a uniform alignment state is presented over the entire thickness of the in-cell retardation layer and a decrease in retardation to heating can be suppressed. In addition, it is considered that since the monomer represented by Chemical formula (2-11) or (2-17) has an amino group and an amide group, thermal stability of the in-cell retardation film is improved due to hydrogen bonding at many hydrogen bonding sites.

The liquid crystal display device in which the in-cell retardation layer was formed using the monomer represented by Chemical formula (2-8), (2-11), or (2-17) had improved outdoor visibility. In addition, by using the monomer represented by Chemical formula (2-8), (2-11), or (2-17), it was possible to suppress a decrease in contrast ratio due to scattering of the in-cell retardation layer.

The monomer represented by Chemical formula (4) had a long alkyl chain length between the polymerization group and the azobenzene group, resulting in a decrease in the orientation of the in-cell retardation layer and low thermal stability.

Example 2-1

(Formation of in-Cell Retardation Layer on CF Substrate)

First, as a reactive mesogenic material, a solution in which a monomer (2% by weight) represented by the following Chemical formula (2-17) and a monomer (8% by weight) represented by the following Chemical formula (3-15) were dissolved was prepared. Propylene glycol monomethyl ether acetate (PEGMEA) was used as a solvent. Subsequently, the solution was applied on a CF substrate using a spin coater, and temporarily baked for 1 minute on a 140° C. hot plate. Then, a principal surface of the CF substrate was irradiated with 3 J/cm² of linearly polarized ultraviolet rays centered at 365 nm from the normal direction to polymerize a reactive mesogen simultaneously with the alignment treatment. The linearly polarized ultraviolet rays were irradiated such that the polarization axis direction was at an angle of 90° with respect to a desired slow axis direction of the in-cell retardation layer. Finally, main baking was performed at 180° C. for 30 minutes to completely remove the solvent and to cure the in-cell retardation layer. After the main baking step, the thickness of the in-cell retardation layer was 1 mm, and the retardation was 135 nm.

[Chem. 16]

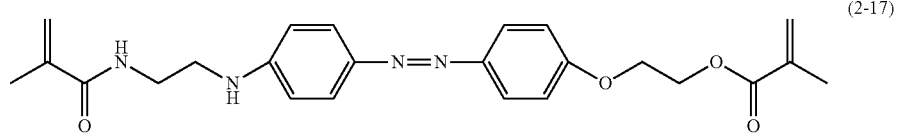

(2-17)

[Chem. 17]

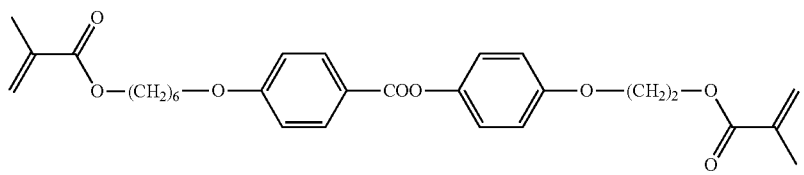

(3-15)

(Step of Producing Liquid Crystal Display Device)

A liquid crystal panel in FFS mode was actually prepared in the following manner. First, a TFT substrate in which a pixel electrode having an FFS electrode structure made of indium tin oxide, an insulating film and a common electrode are laminated, and the CF substrate described above not having an electrode but having an in-cell retardation layer were prepared. Subsequently, a polyimide-based alignment film for rubbing was formed only on the TFT substrate. Subsequently, rubbing treatment was applied to both the polyimide-based alignment film of the TFT substrate and an in-cell retardation film of the CF substrate so that alignment in an antiparallel relationship was achieved. That is, the rubbing treatment was applied in parallel and opposite directions in the state that the TFT substrate and the CF substrate pasted together. The rubbing treatment was performed in a direction forming 45° (45° instead of 45±3°) with respect to the slow axis of the in-cell retardation layer. Subsequently, a sealing member was drawn on the TFT substrate. As the sealing member, a sealing member which is of a type that is cured by both ultraviolet rays and heat was used. Subsequently, a liquid crystal material having negative anisotropy of dielectric constant ($T_{NI}$ is 80° C.) was added dropwise onto the TFT substrate, and a CF substrate having an in-cell retardation layer was pasted. Subsequently, a realignment treatment was performed, provided that the temperature of the liquid crystal cell was defined as $T_{NI}$ or higher (100° C.), so that a liquid crystal cell in FFS mode having an in-cell retardation layer in the cell was completed.

Example 2-2

A liquid crystal cell in FFS mode of Example 2-2 was produced in the same manner as in Example 2-1 except that a solution (solvent: PEGMEA) in which the monomer (2% by weight) represented by Chemical formula (2-17) and a monomer (8% by weight) represented by the following Chemical formula (5) were dissolved was used as a reactive mesogenic material.

[Chem. 18]

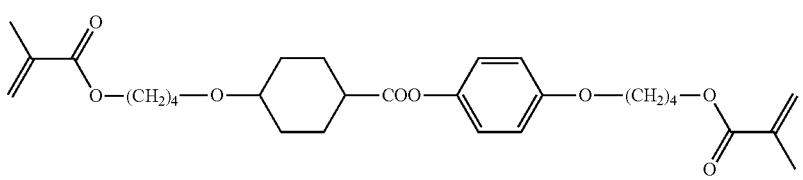

(5)

Example 2-3

A liquid crystal cell in FFS mode of Example 2-3 was produced in the same manner as in Example 2-1 except that a solution (solvent: PEGMEA) in which the monomer (2% by weight) represented by Chemical formula (2-17) and a monomer (8% by weight) represented by the following Chemical formula (6) were dissolved was used as a reactive mesogenic material.

[Chem. 19]

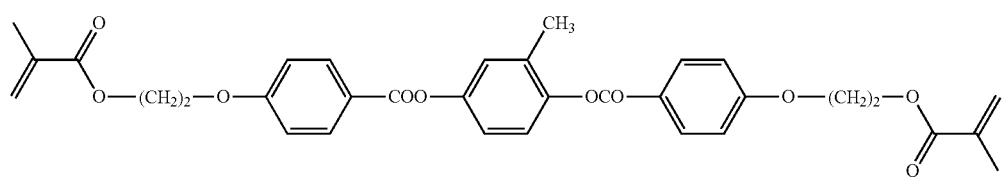

(6)

Comparative Example 2-1

A liquid crystal cell in FFS mode of Comparative Example 2-1 was produced in the same manner as in Example 2-1 except that the step of forming in-cell retardation was different. In this comparative example, first, a polyimide-based alignment film for rubbing was formed on a CF substrate and subjected to rubbing treatment. Thereafter, a solution (solvent: PEGMEA) in which 10% by weight of only a monomer represented by Chemical formula (3-15) and serving as a reactive mesogenic material was dissolved was applied. Then, temporary baking, polymerization by irradiation with non-polarized ultraviolet rays, and main baking were performed to form in-cell retardation. After the main baking step, the thickness of the in-cell retardation was 1 mm, and the retardation was 135 nm.

Comparative Example 2-2

A liquid crystal cell in FFS mode of Comparative Example 2-2 was produced in the same manner as in Example 2-1 except that a solution (solvent: PEGMEA) in which 10% by weight of only a monomer represented by Chemical formula (5) was dissolved was used as a reactive mesogenic material.

Comparative Example 2-3

A liquid crystal cell in FFS mode of Comparative Example 2-3 was produced in the same manner as in Example 2-1 except that a solution (solvent: PEGMEA) in which 10% by weight of only a monomer represented by Chemical formula (6) was dissolved was used as a reactive mesogenic material.

Comparative Example 2-4

A liquid crystal cell in FFS mode of Comparative Example 2-4 was produced in the same manner as in Example 2-1 except that in-cell retardation was not formed on a CF substrate. The liquid crystal cell of this comparative example was produced using the same material as in Example 2-1, except that the CF substrate did not have an in-cell retardation layer.

<Evaluation Test>

The results of the same tests as in Example 1-1 etc. are shown in Table 2 below.

TABLE 2

| | | Retardation of in-cell retardation layer (nm) | | Liquid crystal display device | |
|---|---|---|---|---|---|
| | Reactive mesogen | Before heating | After heating (30 min) | Contrast ratio | Outdoor visibility |
| Example 2-1 | (2-17) + (3-15) | 135 | 135 | 681 | Good |
| Example 2-2 | (2-17) + (5) | 135 | 135 | 680 | Good |
| Example 2-3 | (2-17) + (6) | 135 | 135 | 685 | Good |
| Comparative Example 2-1 | (3-15) | 135 | 105 | 495 | Good |
| Comparative Example 2-2 | (5) | 135 | 102 | 490 | Good |
| Comparative Example 2-3 | (6) | 135 | 103 | 490 | Good |
| Comparative Example 2-4 | — | — | — | 880 | Poor |

For in-cell retardation layers formed using reactive mesogen, even in the in-cell retardation layers produced using a mixed monomer of an azobenzene group-containing monomer and a monomer not containing an azobenzene group, there was no decrease in retardation after heat treatment at 200° C. for 30 minutes. On the other hand, when an in-cell retardation layer was formed on a polyimide alignment film using a monomer not containing an azobenzene group, the retardation decreased. By using an azobenzene group-containing monomer, it was confirmed that even when a mixed monomer was used, the orientation was exhibited by irradiation with polarized ultraviolet rays.

Example 3-1

(Formation of Retardation Layer on CF Substrate)

First, as a reactive mesogenic material, a solution in which a monomer (2% by weight) represented by the following Chemical formula (2-17) and a monomer (8% by weight) represented by the following Chemical formula (6) were dissolved was prepared. Subsequently, the solution was applied on a CF substrate using a spin coater, and temporarily baked for 1 minute on a 140° C. hot plate. Then, a principal surface of the CF substrate was irradiated with 3 J/cm² of linearly polarized ultraviolet rays centered at 365 nm from the normal direction to polymerize a reactive mesogen simultaneously with the alignment treatment. The linearly polarized ultraviolet rays were irradiated such that the polarization axis direction was at an angle of 90° with respect to a desired slow axis direction of the in-cell retardation layer. Finally, main baking was performed at 180° C. for 30 minutes to completely remove the solvent and to cure the in-cell retardation layer. After the main baking step, the thickness of the in-cell retardation layer was 1 mm, and the retardation was 135 nm.

[Chem. 20]

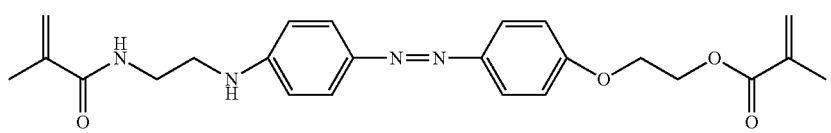

(2-17)

[Chem. 21]

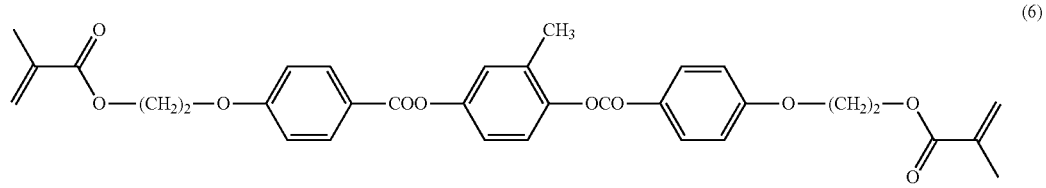

(Step of Producing Liquid Crystal Display Device)

A liquid crystal panel in FFS mode was actually prepared in the following manner. First, a TFT substrate in which a pixel electrode having an FFS electrode structure made of indium tin oxide, an insulating film and a common electrode are laminated, and the CF substrate described above not having an electrode but having an in-cell retardation layer were prepared. Subsequently, a photo-alignment film (polymer film) was formed on both substrates using polyamic acid containing a cinnamate group represented by the following Chemical formula (7). Subsequently, a photo-alignment treatment was performed on both of the photo-alignment films so that alignment in an antiparallel relationship was achieved. That is, the photo-alignment treatment was applied such that the TFT substrate and the CF substrate pasted together in parallel and opposite directions. The photo-alignment treatment was performed in a direction in which the polarization axis of the irradiated polarized light formed 45° (45° instead of 45±3°) with respect to the slow axis of the in-cell retardation layer. In the photo-alignment treatment, linearly polarized ultraviolet rays of 280 to 330 nm were irradiated using a cut filter. Subsequently, a sealing member was drawn on the TFT substrate. As the sealing member, a sealing member which is of a type that is cured by both ultraviolet rays and heat was used. Subsequently, a liquid crystal material having negative anisotropy of dielectric constant ($T_{NI}$ is 80° C.) was added dropwise onto the TFT substrate, and a CF substrate having an in-cell retardation layer was pasted. Subsequently, a realignment treatment was performed, provided that the temperature of the liquid crystal cell was defined as $T_{NI}$ or higher (100° C.), so that a liquid crystal cell in FFS mode having an in-cell retardation layer in the cell was completed.

[Chem. 22]

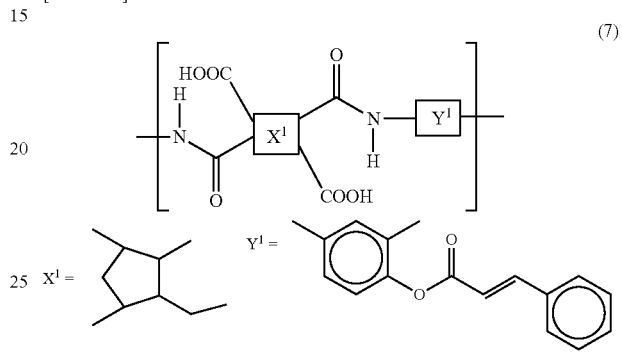

Example 3-2

A liquid crystal cell in FFS mode of Example 3-2 was produced in the same manner as in Example 3-1 except that a polyimide-based alignment film for rubbing was formed as a reactive mesogenic material instead of polyamic acid represented by Chemical formula (7).

Comparative Example 3

A liquid crystal cell in FFS mode of Comparative Example 3 was produced in the same manner as in Example 3-1 except that in-cell retardation was not formed on a CF substrate. The liquid crystal cell of this comparative example was produced using the same material as in Example 3-1, except that the CF substrate did not have an in-cell retardation layer.

<Evaluation Test>

The results of the same tests as in Example 1-1 etc. are shown in Table 3 below.

TABLE 3

|  | Reactive mesogen | Alignment film | Retardation of in-cell retardation layer (nm) | | Liquid crystal display device | |
|---|---|---|---|---|---|---|
|  |  |  | Before heating | After heating (30 min) | Contrast ratio | Outdoor visibility |
| Example 3-1 | (2-17) + (6) | (7) | 135 | 135 | 730 | Good |
| Example 3-2 | (2-17) + (6) | Rubbing alignment film |  |  | 685 | Good |
| Comparative Example 3 | — | (7) | — | — | 900 | Poor |

In the liquid crystal display device in which an in-cell retardation layer was formed using the monomer represented by Chemical formulas (2-17) and (6) and which used a photo-alignment film containing a cinnamate group represented by Chemical formula (7), the contrast ratio was higher than the case where a rubbing alignment film was used, and the outdoor visibility was also good. The high contrast ratio is considered to be due to both the fact that scattering of the in-cell retardation layer can be suppressed and the use of the photo-alignment film.

Example 4

A liquid crystal cell in FFS mode of Example 4 was produced in the same manner as in Example 3-1 except that a polyamic acid containing a cyclobutane ring represented by the following Chemical formula (8) was used as a photo-alignment film material, and as a photo-alignment treatment, linearly polarized ultraviolet rays of 300 nm or less were irradiated using a cut filter.

[Chem. 23]

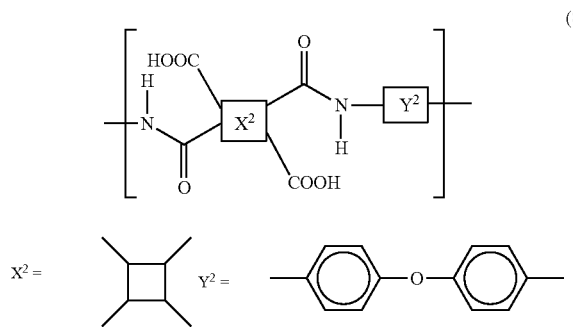

(8)

Comparative Example 4

A liquid crystal cell in FFS mode of Comparative Example 4 was produced in the same manner as in Example 4 except that in-cell retardation was not formed on a CF substrate. The liquid crystal cell of this comparative example was produced using the same material as in Example 4, except that the CF substrate did not have an in-cell retardation layer.

<Evaluation Test>

The results of the same tests as in Example 1-1 etc. are shown in Table 4 below.

In the liquid crystal display device in which an in-cell retardation layer was formed using the monomer represented by Chemical formulas (2-17) and (6) and which used a decomposable photo-alignment film represented by Chemical formula (8), the contrast ratio was higher than the case where a rubbing alignment film was used, and the outdoor visibility was also good.

[Additional Remarks]

One aspect of the present invention may be a liquid crystal display device including a pair of substrates, a liquid crystal layer which is sandwiched between the pair of substrates and contains a liquid crystal material, and an alignment layer which is in contact with the liquid crystal layer. In this liquid crystal display device, at least one of the pair of substrates has a retardation layer on a side toward the liquid crystal layer, the alignment layer aligns a liquid crystal compound in the liquid crystal material, the retardation layer contains a polymer formed by polymerization of at least one monomer, and the at least one monomer includes a monomer (monomer (1)) represented by the following Chemical formula (1):

[Chem. 24]

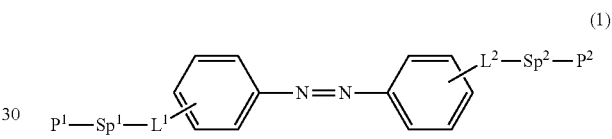

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

The monomer (1) has an azobenzene group, and since the azobenzene group can develop the orientation by polarized light absorption, when the in-cell retardation layer is formed using the monomer (1), the monomer (1) itself induces alignment, so that the entire in-cell retardation layer can be aligned. Therefore, alignment stability of the in-cell retardation layer with respect to heat is improved, and a decrease in the orientation of the in-cell retardation layer due to heat, that is, a decrease in retardation can be suppressed. Furthermore, since the orientation of the monomer and its polymer

TABLE 4

| | | | Retardation of in-cell retardation layer (nm) | | Liquid crystal display device | |
|---|---|---|---|---|---|---|
| | RM | Alignment film | Before heating | After heating (30 min) | Contrast ratio | Outdoor visibility |
| Example 4 | (2-17) + (6) | (8) | 135 | 135 | 750 | Good |
| Example 3-2 | (2-17) + (6) | Rubbing alignment film | | | 685 | Good |
| Comparative Example 4 | — | (8) | — | — | 900 | Poor | in the in-cell retardation layer is improved, a decrease in contrast ratio due to scattering can be suppressed to a low level.

In one aspect of the present invention, the monomer represented by Chemical formula (1) may contain at least one group of at least one of a —CONH— group or an —NH— group. When the monomer (1) has an amino group (—NH— group) and/or an amide group (—CONH—) in the molecule, hydrogen bonds are induced between the molecules. Therefore, there are effects of improving the contrast ratio by further improving the orientation and improving reliability by improving thermal stability.

In one aspect of the present invention, in Chemical formula (1), at least one of $Sp^1$ or $Sp^2$ may represent a linear alkylene group containing 1 to 6 carbon atoms. Thereby, the orientation after polymerization of the monomer (1) can be further increased, and polymerization of the monomer (1) can easily proceed.

In one aspect of the present invention, in the monomer represented by Chemical formula (1), an —NH— group or an —O— group may be bonded to at least one of phenylene groups in an azobenzene group. Thereby, the monomer (1) can be polymerized without a polymerization initiator.

In one aspect of the present invention, the monomer represented by Chemical formula (1) may be a monomer represented by any one of the following Chemical formulas (2-1) to (2-17).

[Chem. 25]

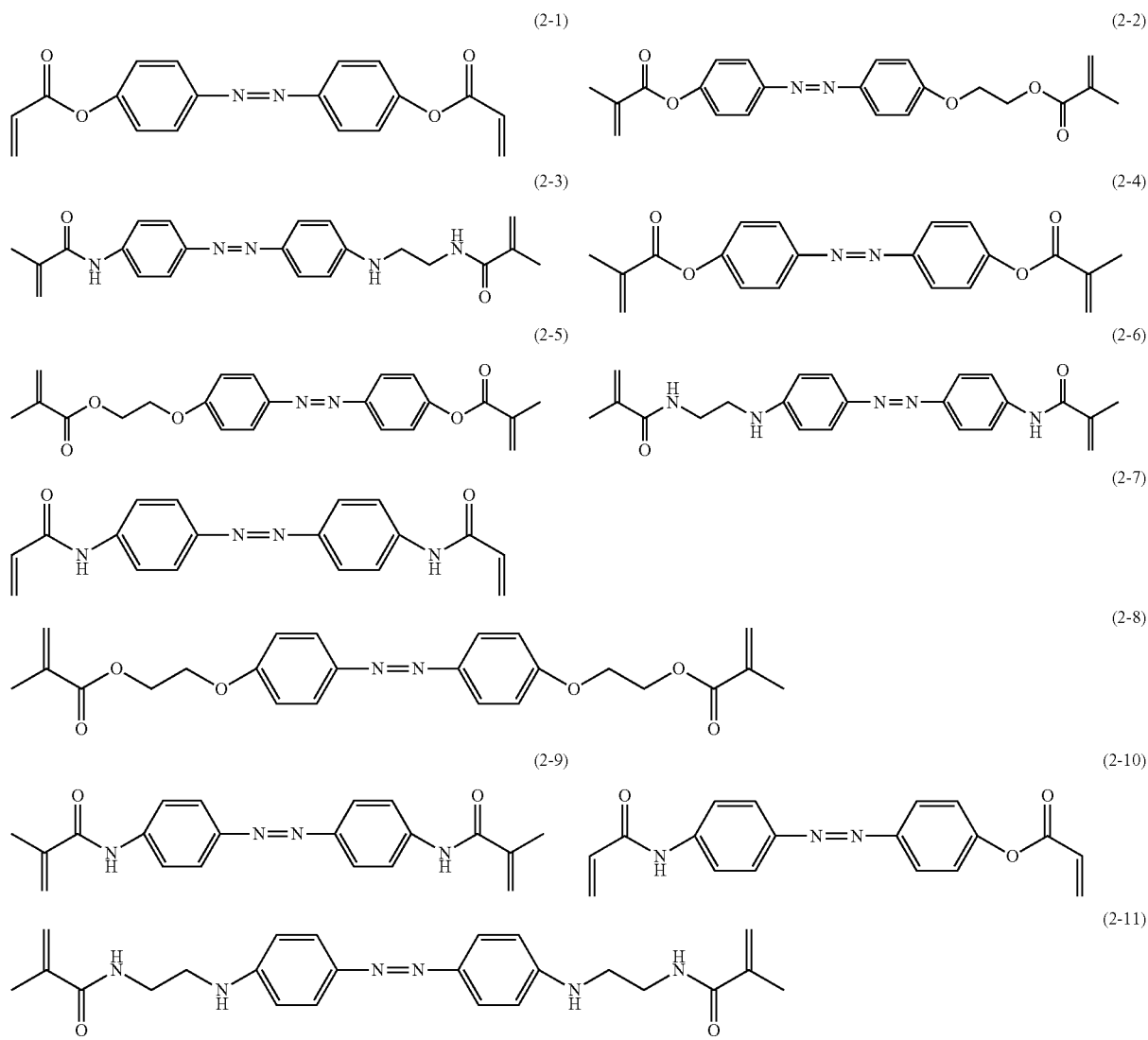

[Chem. 26]

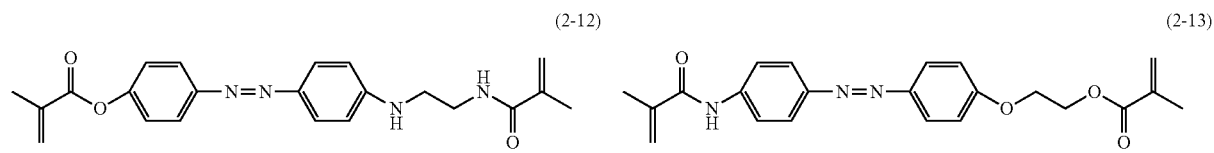

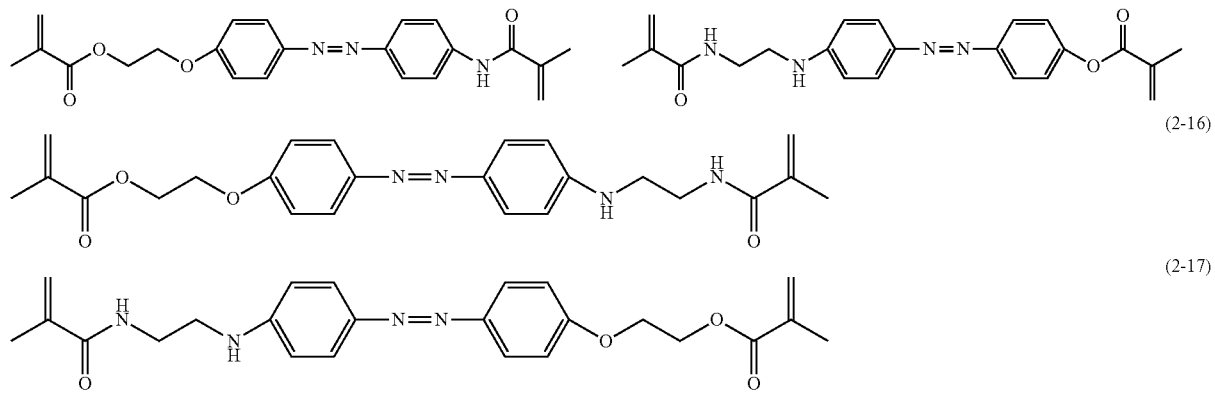
In one aspect of the present invention, the at least one monomer may further contain a second monomer which is different from the monomer represented by Chemical formula (1).
In one aspect of the present invention, the second monomer may be a monomer represented by any one of the following Chemical formulas (3-1) to (3-15).
[Chem. 27]
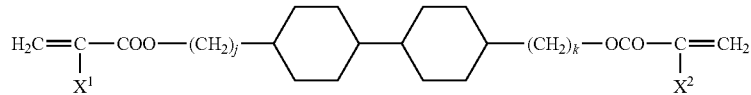
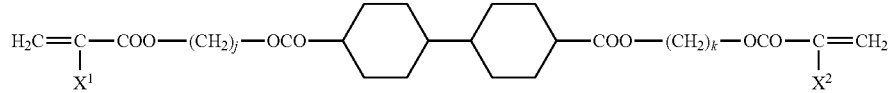
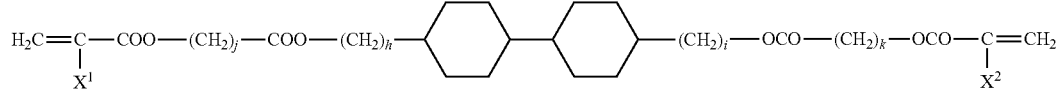
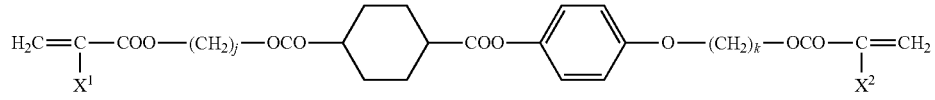
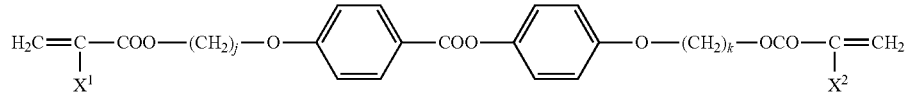
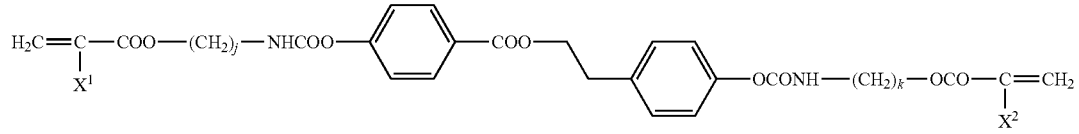
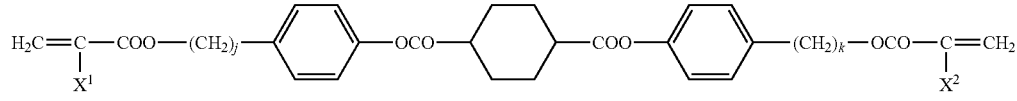
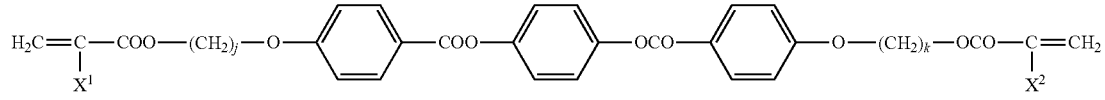

-continued

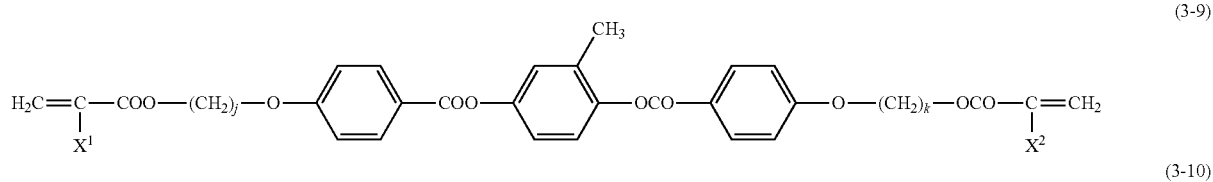

(3-9)

(3-10)

[Chem. 28]

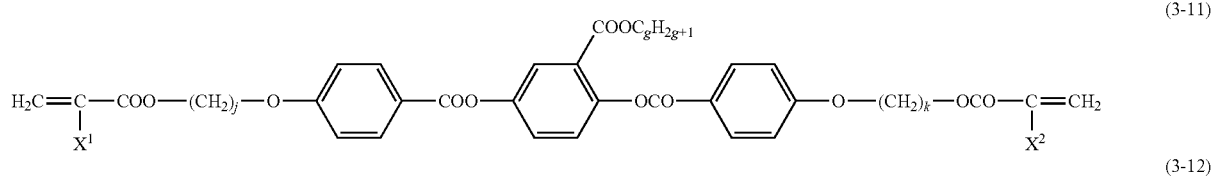

(3-11)

(3-12)

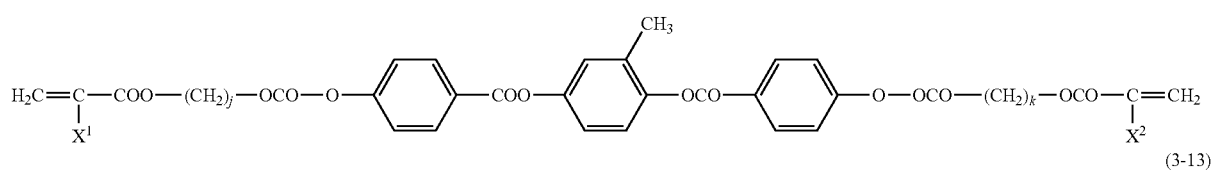

(3-13)

(3-14)

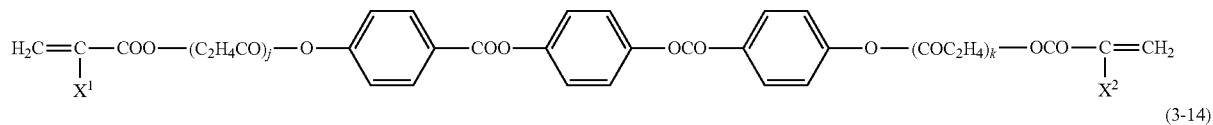

(3-15)

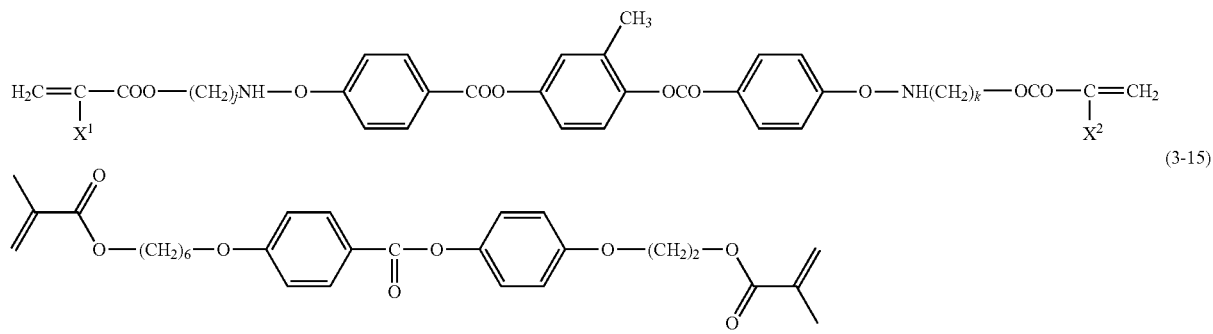

(wherein $X^1$ and $X^2$ are the same as or different from each other, and each represent a hydrogen atom or a methyl group. g, h and i are the same as or different from each other, and each represent an integer of 1 to 18.

j and k are the same as or different from each other, and each represent an integer of 1 to 12.)

In one aspect of the present invention, the alignment layer may include a photo-alignment film. Thereby, the orientation of the liquid crystal layer can be further improved, and the contrast ratio of the liquid crystal display device can be further improved.

In one aspect of the present invention, the photo-alignment film may contain a cyclobutane ring. Thereby, the light absorption wavelength of the photo-alignment film and the light absorption wavelength of the monomer (1) having an azobenzene group can be prevented from overlapping each other.

In one aspect of the present invention, the photo-alignment film may contain a cinnamate group. Thereby, the light absorption wavelength of the photo-alignment film and the light absorption wavelength of the monomer (1) having an azobenzene group can be prevented from overlapping each other.

Another aspect of the present invention may be a production method for a liquid crystal display device, including applying a solution containing at least one monomer including a monomer (monomer (1)) represented by the following Chemical formula (1) on at least one of a pair of substrates, irradiating the monomer layer with polarized light to form a retardation layer formed by polymerization and alignment of the at least one monomer, and forming an alignment layer, which aligns a liquid crystal compound in the liquid crystal material, on at least one of the pair of substrates.

[Chem. 29]

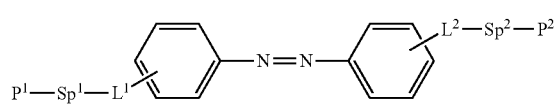

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

The monomer (1) has an azobenzene group, and since the azobenzene group can develop the orientation by polarized light absorption, when the in-cell retardation layer is formed using the monomer (1), the monomer (1) itself induces alignment, so that the entire in-cell retardation layer can be aligned. Therefore, alignment stability of the in-cell retardation layer with respect to heat is improved, and a decrease in the orientation of the in-cell retardation layer due to heat, that is, a decrease in retardation can be suppressed. Furthermore, since the orientation of the monomer and its polymer in the in-cell retardation layer is improved, a decrease in contrast ratio due to scattering can be suppressed to a low level.

In one aspect of the present invention, the forming of an alignment layer may include rubbing a surface of the retardation layer.

In one aspect of the present invention, the forming of an alignment layer may include forming a polymer film which contains a polymer containing a cinnamate group on the retardation layer, and irradiating the polymer film with polarized light. Thereby, the orientation of the liquid crystal layer can be further improved, and the contrast ratio of the liquid crystal display device can be further improved. The light absorption wavelength of the polymer film and the light absorption wavelength of the monomer (1) having an azobenzene group can be prevented from overlapping each other.

In one aspect of the present invention, the forming of an alignment layer may include forming a polymer film which contains a polymer containing a cyclobutane ring on the retardation layer, and irradiating the polymer film with polarized light. Thereby, the orientation of the liquid crystal layer can be further improved, and the contrast ratio of the liquid crystal display device can be further improved. The light absorption wavelength of the polymer film and the light absorption wavelength of the monomer (1) having an azobenzene group can be prevented from overlapping each other.

Still another aspect of the present invention may be a retardation layer-forming monomer (monomer (1)) represented by the following Chemical formula (1):

[Chem. 30]

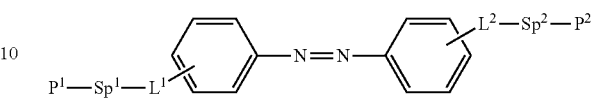

(1)

(wherein $P^1$ and $P^2$ are the same as or different from each other, and each represent an acryloyloxy group, a methacryloyloxy group, an acryloylamino group, a methacryloylamino group, a vinyl group, or a vinyloxy group; $Sp^1$ and $Sp^2$ are the same as or different from each other, and each represent a linear, branched or cyclic alkylene group containing 1 to 10 carbon atoms or a linear, branched or cyclic alkenylene group containing 1 to 10 carbon atoms, or each represent a direct bond; and $L^1$ and $L^2$ are the same as or different from each other, and each represent a —NH— group, —O— group, —S— group, or a direct bond.)

The monomer (1) has an azobenzene group, and since the azobenzene group can develop the orientation by polarized light absorption, when the in-cell retardation layer is formed using the monomer (1), the monomer (1) itself induces alignment, so that the entire in-cell retardation layer can be aligned. Therefore, alignment stability of the in-cell retardation layer with respect to heat is improved, and a decrease in the orientation of the in-cell retardation layer due to heat, that is, a decrease in retardation can be suppressed.

In one aspect of the present invention, the monomer (1) may contain at least one group of at least one of a —CONH— group or an —NH— group. When the monomer (1) has an amino group (—NH— group) and/or an amide group (—CONH—) in the molecule, hydrogen bonds are induced between the molecules. Therefore, there are effects of improving the contrast ratio by further improving the orientation and improving reliability by improving thermal stability.

In one aspect of the present invention, in Chemical formula (1), at least one of $Sp^1$ or $Sp^2$ may represent a linear alkylene group containing 1 to 6 carbon atoms. Thereby, the orientation after polymerization of the monomer (1) can be further increased, and polymerization of the monomer (1) can easily proceed.

In one aspect of the present invention, in the monomer (1), an —NH— group or an —O— group may be bonded to at least one of phenylene groups in an azobenzene group. Thereby, the monomer (1) can be polymerized without a polymerization initiator.

In one aspect of the present invention, the monomer (1) may be a monomer represented by any one of the following Chemical formulas (2-1) to (2-17).

[Chem. 31]

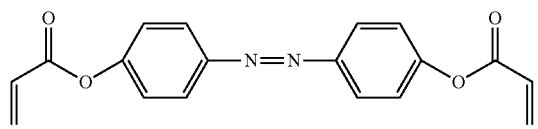

(2-1)

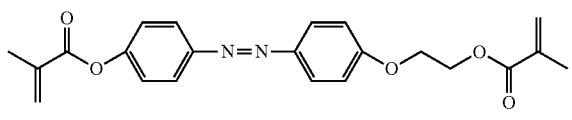

(2-2)

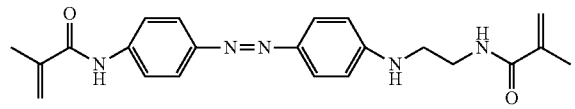

(2-3)

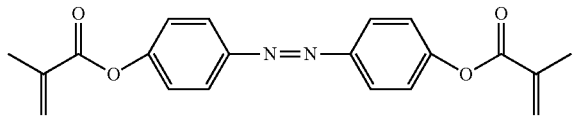

(2-4)

-continued

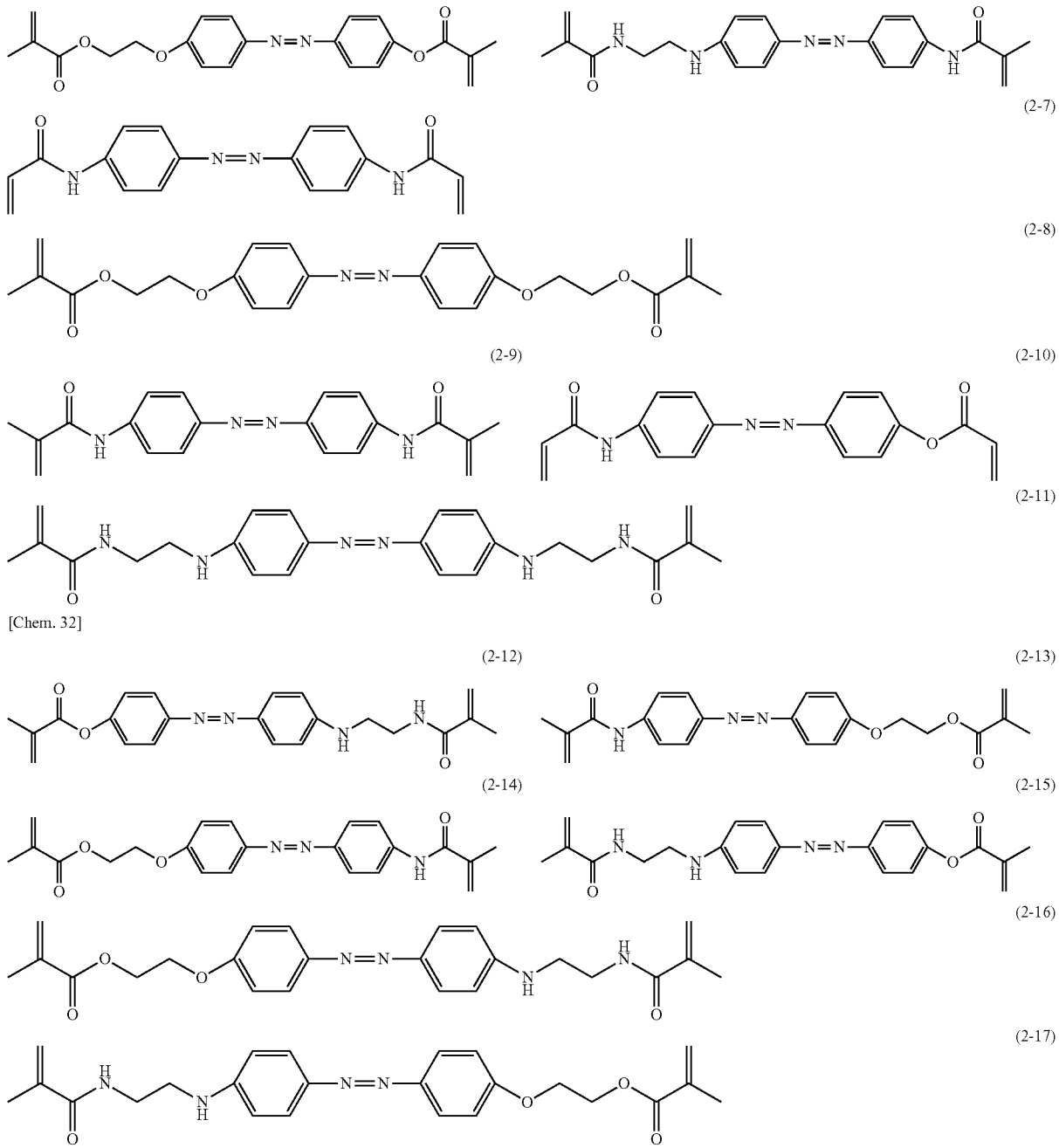

The embodiments of the present invention shown above may be combined as appropriate within the spirit of the present invention.

REFERENCE SIGNS LIST 11 first linearly polarizing plate
12 out-cell retardation layer
20 color filter substrate (CF substrate)
21 transparent base material
22 color filter/black matrix
23a monomer layer
23 in-cell retardation layer
24 alignment layer
30 liquid crystal layer
40 TFT substrate
41 alignment layer
42 TFT layer
43 transparent base material
51 second linearly polarizing plate
60 backlight

The invention claimed is:
1. A retardation layer-forming monomer represented by Chemical formula (1):

(1)

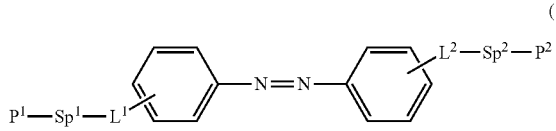

wherein $P^1$ represents an acryloylamino group or a methacryloylamino group, and $P^2$ represents an acryloyloxy group, a methacryloyloxy group, an acryloylamino group, a methacryloylamino group, a vinyl group, or a vinyloxy group; $Sp^1$ and $Sp^2$ are the same as or different from each other, and each represents a linear, branched or cyclic alkylene group containing 1 to 10 carbon atoms or a linear, branched or cyclic alkenylene group containing 1 to 10 carbon atoms, or each represents a direct bond; and $L^1$ and $L^2$ are the same as or different from each other, and each represents a —NH— group, —O— group, —S— group, or a direct bond, and wherein in Chemical formula (1), $L^1$ represents a —NH— group, and $L^2$ represents a —NH— group, —O— group, —S— group, or a direct bond.

2. A retardation layer containing a polymer formed by polymerization of at least one monomer including a retardation layer-forming monomer represented by Chemical formula (1):

[Chem. 6]

(1)

wherein $P^1$ represents an acryloylamino group or a methacryloylamino group, and $P^2$ represents an acryloyloxy group, a methacryloyloxy group, an acryloylamino group, a methacryloylamino group, a vinyl group, or a vinyloxy group; $Sp^1$ and $Sp^2$ are the same as or different from each other, and each represents a linear, branched or cyclic alkylene group containing 1 to 10 carbon atoms or a linear, branched or cyclic alkenylene group containing 1 to 10 carbon atoms, or each represents a direct bond; and $L^1$ and $L^2$ are the same as or different from each other, and each represents a —NH— group, —O— group, —S— group, or a direct bond, when both of $Sp^1$ and $Sp^2$ represent direct bond, and both of $L^1$ and $L^2$ represent direct bond, $P^2$ represents an acryloyloxy group or a methacryloyloxy group, wherein the at least one monomer further includes a second monomer different from the monomer represented by Chemical formula (1), and wherein the second monomer is a monomer represented by any one of Chemical formulas (5), (6) and (3-15):

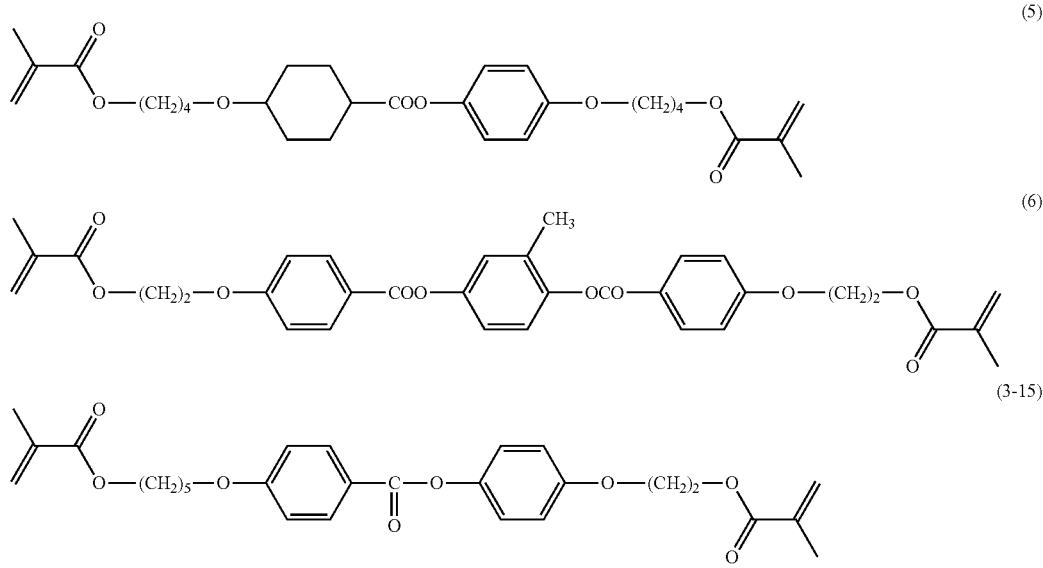

3. The retardation layer-forming monomer according to claim 1,
wherein in the Chemical formula (1), at least one of $Sp^1$ or $Sp^2$ represents a linear alkylene group containing 1 to 6 carbon atoms.

4. The retardation layer-forming monomer according to claim 1, being a monomer represented by any one of Chemical formulas (2-3), (2-11), (2-12) and (2-16):

[Chem. 2]

(2-1)

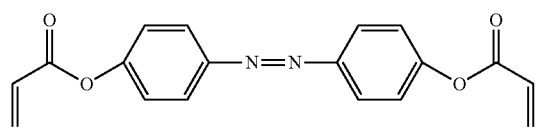

(2-2)

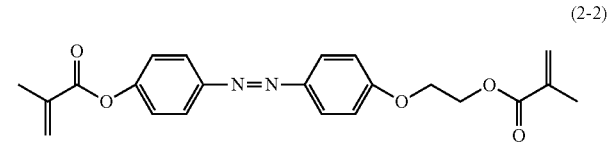

-continued
(2-3)
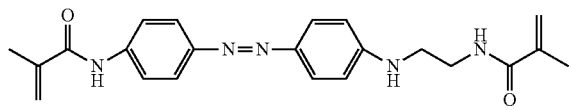
(2-4)
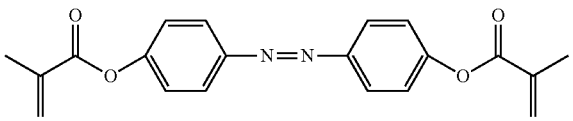
(2-5)
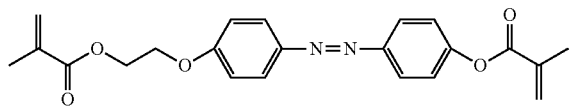
(2-6)
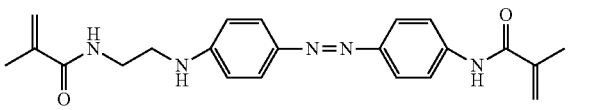
(2-7)
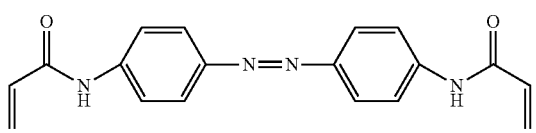
(2-8)
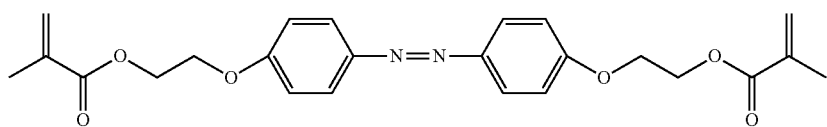
(2-9)
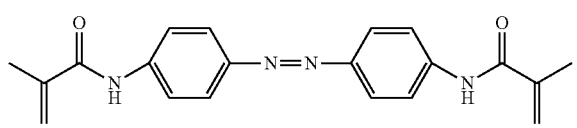
(2-10)
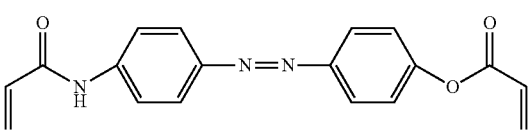
(2-11)
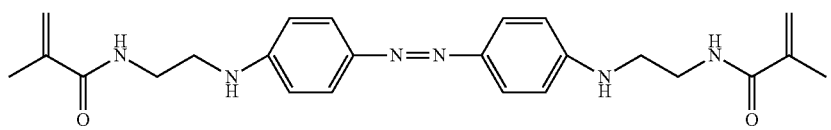
[Chem. 3]
(2-12)
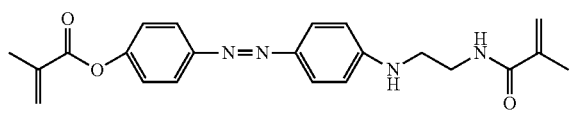
(2-13)
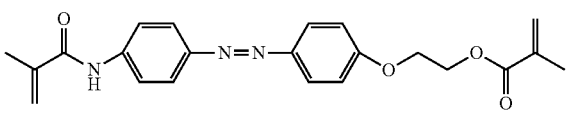
(2-14)
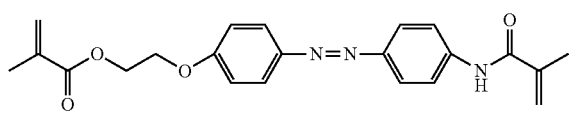
(2-15)
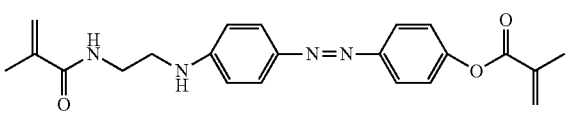
(2-16)
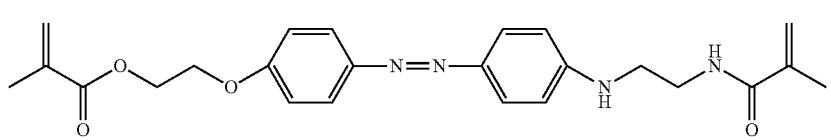
(2-17)
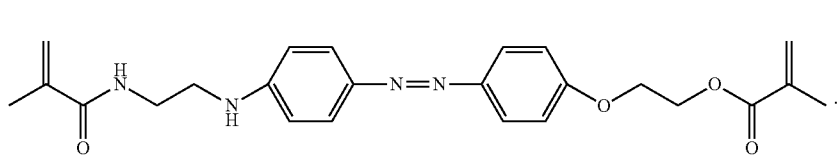

5. A retardation layer containing a polymer formed by polymerization of at least one monomer including the retardation layer-forming monomer according to claim 1.

6. The retardation layer according to claim 5, wherein the at least one monomer further includes a second monomer different from the monomer represented by Chemical formula (1).

7. The retardation layer according to claim 6, wherein the second monomer is a monomer represented by any one of Chemical formulas (3-1) to (3-15):

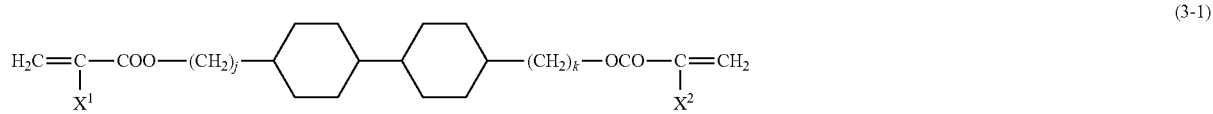
(3-1)

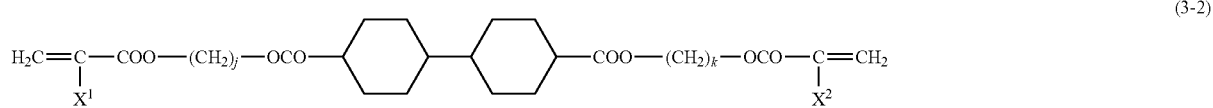
(3-2)

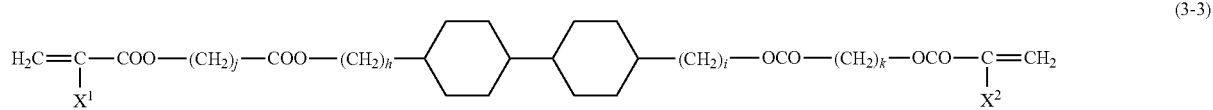
(3-3)

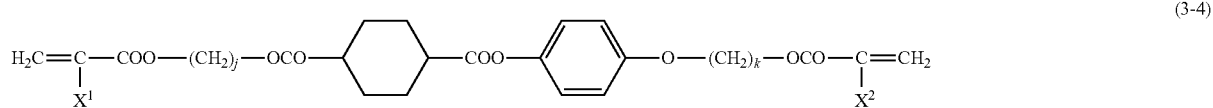
(3-4)

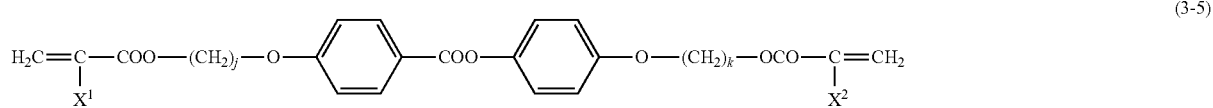
(3-5)

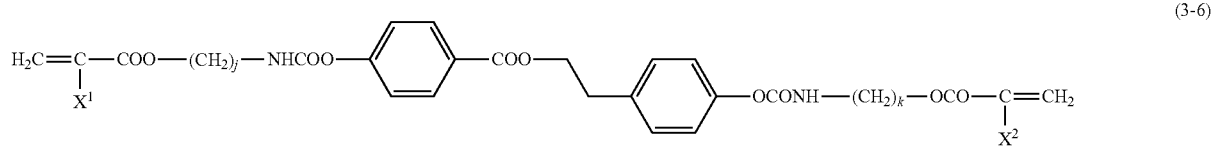
(3-6)

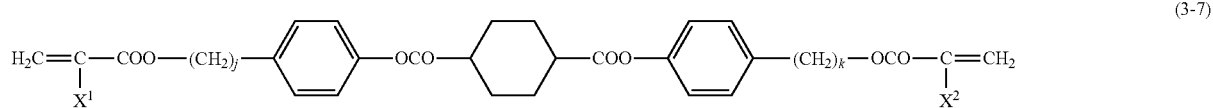
(3-7)

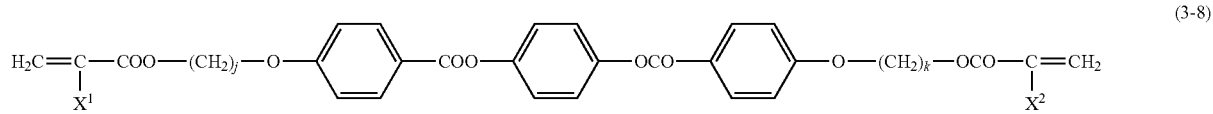
(3-8)

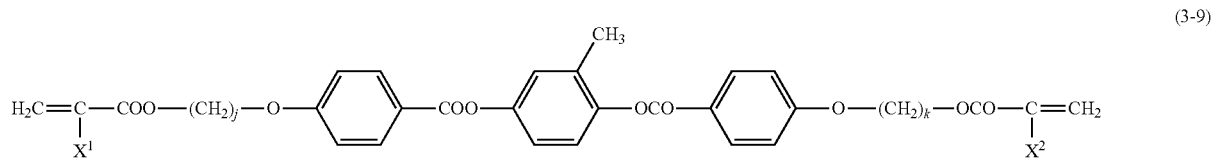
(3-9)

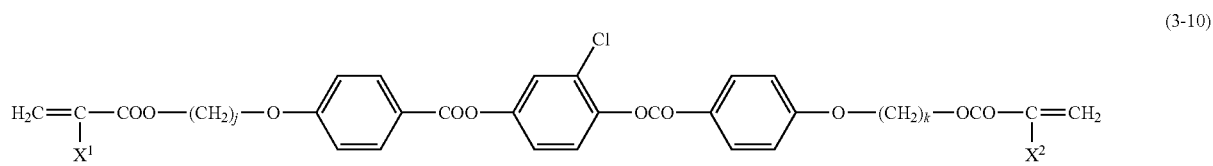
(3-10)

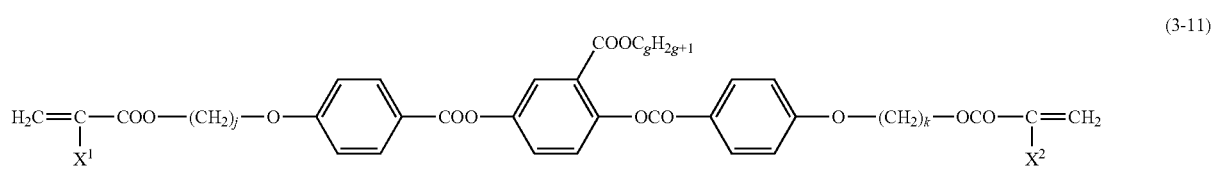
(3-11)

(3-12)
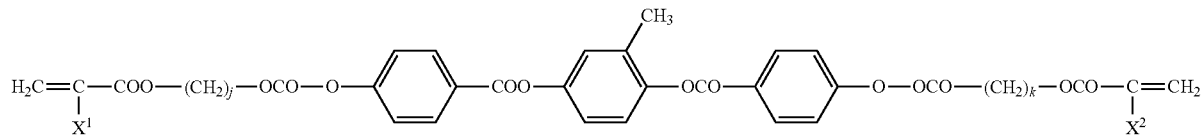

(3-13)
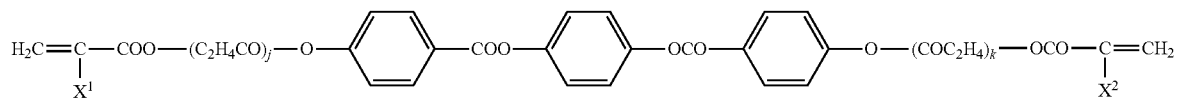

(3-14)
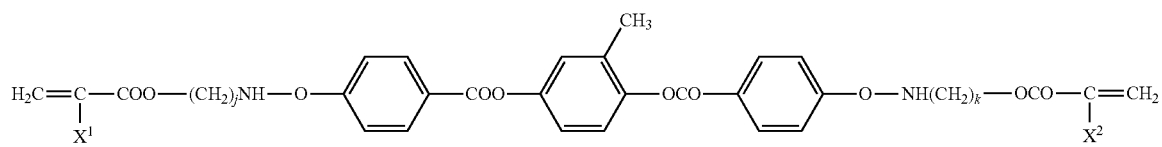

(3-15)
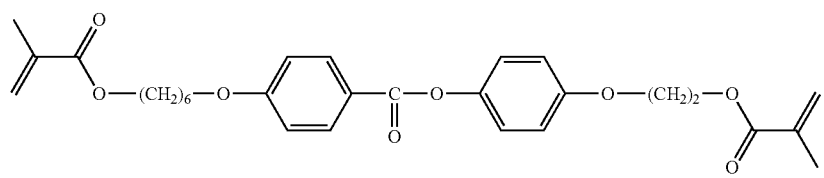

wherein $X^1$ and $X^2$ are the same as or different from each other, and each represents a hydrogen atom or a methyl group; g, h and i are the same as or different from each other, and each represents an integer of 1 to 18; and j and k are the same as or different from each other, and each represents an integer of 1 to 12.

8. The retardation layer according to claim 6, wherein the second monomer is a monomer represented by any one of Chemical formulas (5), (6) and (3-15):

(5)
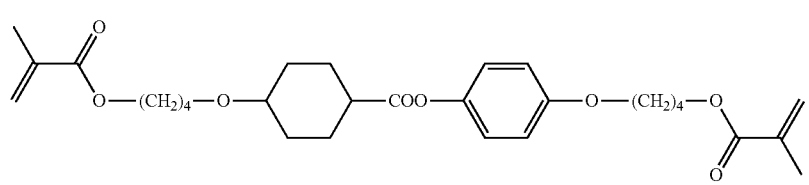

(6)
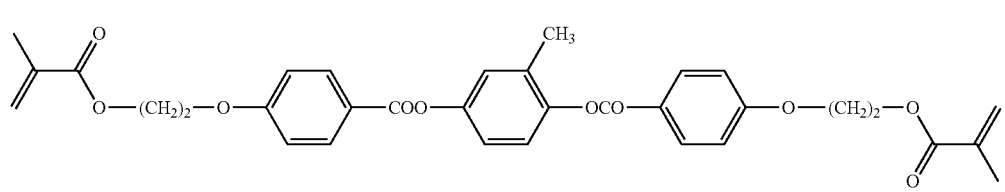

(3-15)
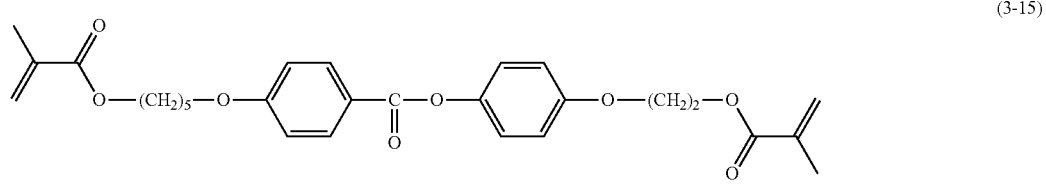

9. The retardation layer according to claim 6,
wherein the retardation layer-forming monomer is represented by Chemical formula (2-16):

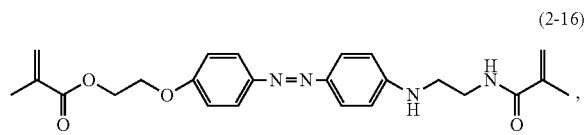 [SMILES: C=C(C)C(=O)NCCNc1ccc(N=Nc2ccc(OCCOC(=O)C(=C)C)cc2)cc1]

(2-16)

and
the second monomer is a monomer represented by any one of Chemical formulas (5), (6) and (3-15):

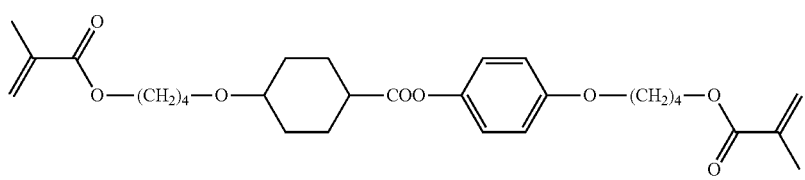

(5)

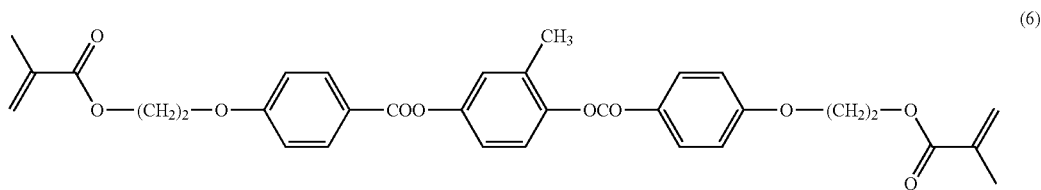

(6)

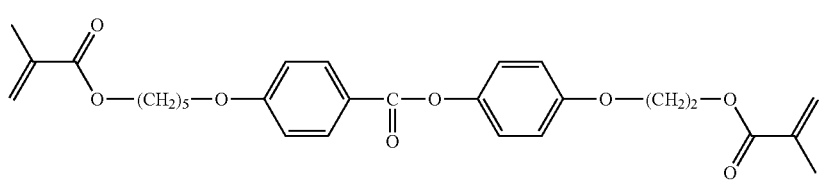

(3-15)

10. The retardation layer according to claim 2, containing at least one group of at least one of a —CONH— group or an —NH— group.

11. A retardation layer containing a polymer formed by polymerization of at least one monomer including a retardation layer-forming monomer represented by Chemical formula (1):

[Chem. 7]

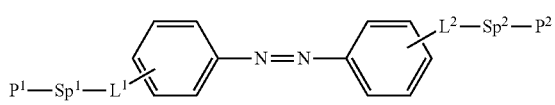

(1)

wherein $P^1$ represents an acryloylamino group or a methacryloylamino group, and $P^2$ represents an acryloyloxy group, a methacryloyloxy group, an acryloylamino group, a methacryloylamino group, a vinyl group, or a vinyloxy group; $Sp^1$ and $Sp^2$ are the same as or different from each other, and each represents a linear, branched or cyclic alkylene group containing 1 to 10 carbon atoms or a linear, branched or cyclic alkenylene group containing 1 to 10 carbon atoms, or each represents a direct bond; and $L^1$ and $L^2$ are the same as or different from each other, and each represents a —NH— group, —O— group, —S— group, or a direct bond, when both of $Sp^1$ and $Sp^2$ represent direct bond, and both of $L^1$ and $L^2$ represent direct bond, $P^2$ represents an acryloyloxy group or a methacryloyloxy group, wherein the at least one monomer further includes a second monomer different from the monomer represented by Chemical formula (1), wherein the retardation layer-forming monomer is represented by Chemical formula (2-16):

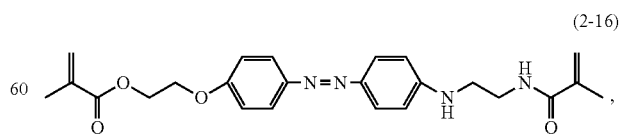

(2-16)

and
the second monomer is a monomer represented by any one of Chemical formulas (5), (6) and (3-15):

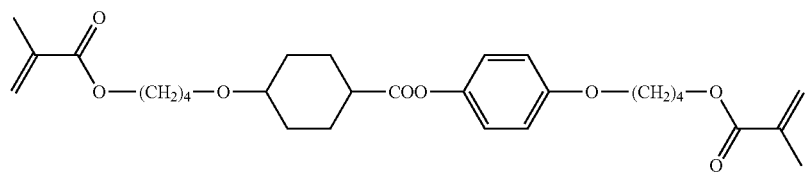

(5)

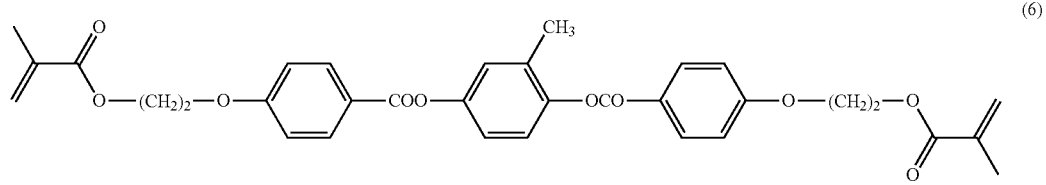

(6)

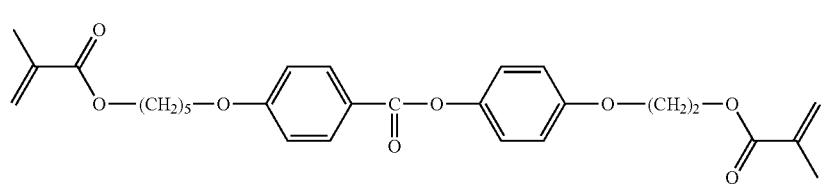

(3-15)

12. The retardation layer according to claim 2, wherein in the Chemical formula (1), at least one of $Sp^1$ or $Sp^2$ represents a linear alkylene group containing 1 to 6 carbon atoms.

13. The retardation layer according to claim 2, wherein an —NH— group or an —O— group is bonded to at least one of phenylene groups in an azobenzene group.

14. The retardation layer according to claim 2, the retardation layer-forming monomer being a monomer represented by any one of Chemical formulas (2-3), (2-10) to (2-13) and (2-16):

[Chem. 8]

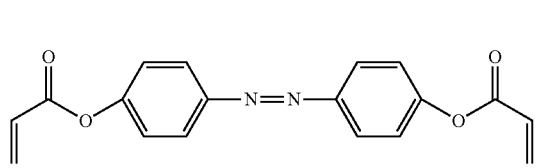 (2-1)

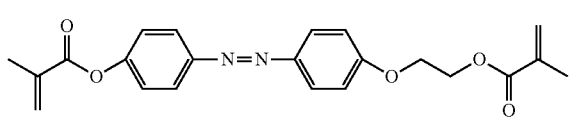 (2-2)

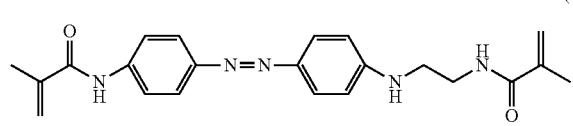 (2-3)

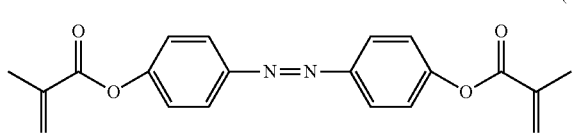 (2-4)

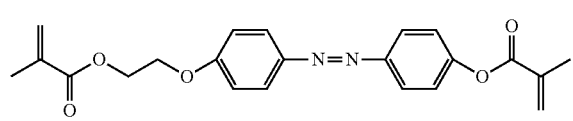 (2-5)

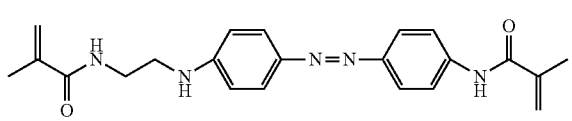 (2-6)

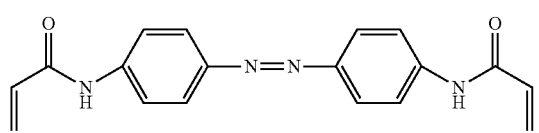 (2-7)

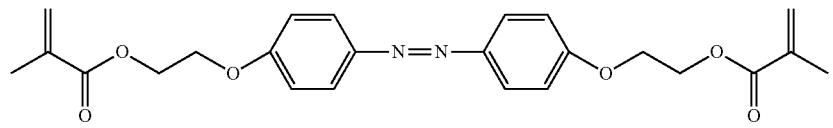
(2-8)
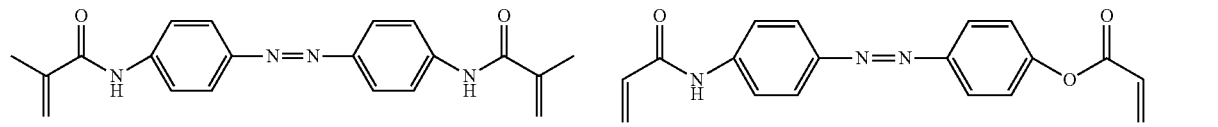
(2-9) (2-10)
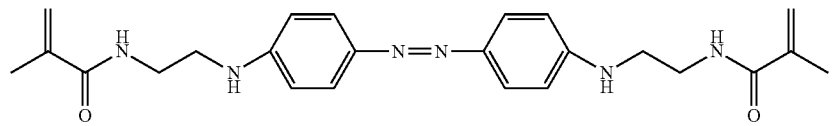
(2-11)
[Chem. 9]
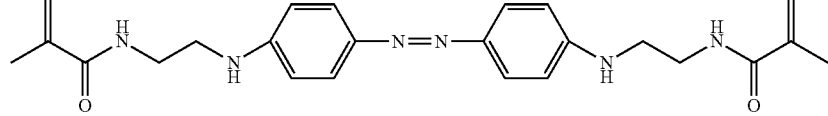
(2-12) (2-13)
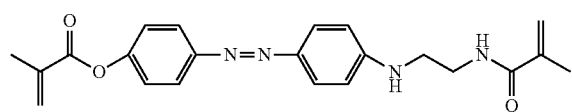
(2-14)
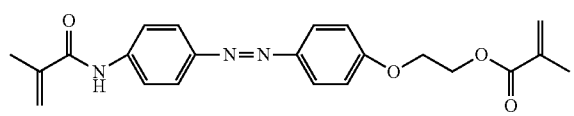
(2-15)
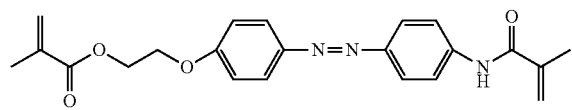
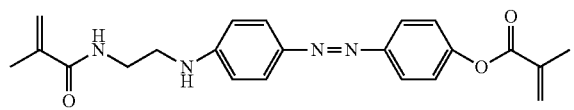
(2-16)
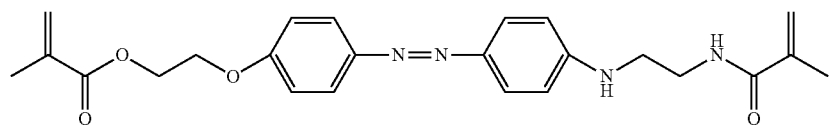
(2-17)
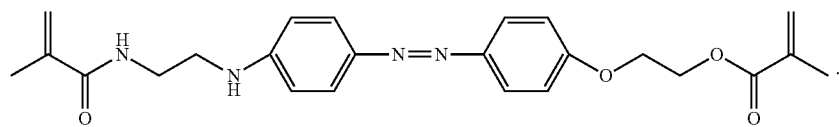
15. The retardation layer according to claim 2, wherein the retardation layer-forming monomer is represented by Chemical formula (2-16):
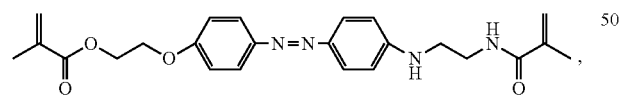
(2-16)
and
the second monomer is a monomer represented by any one of Chemical formulas (5), (6) and (3-15):
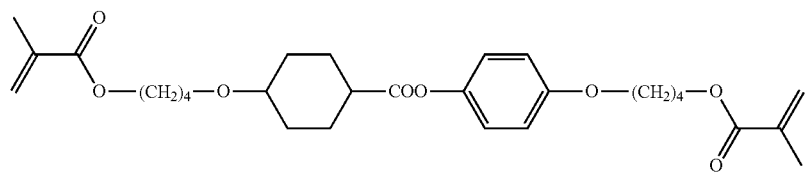
(5)

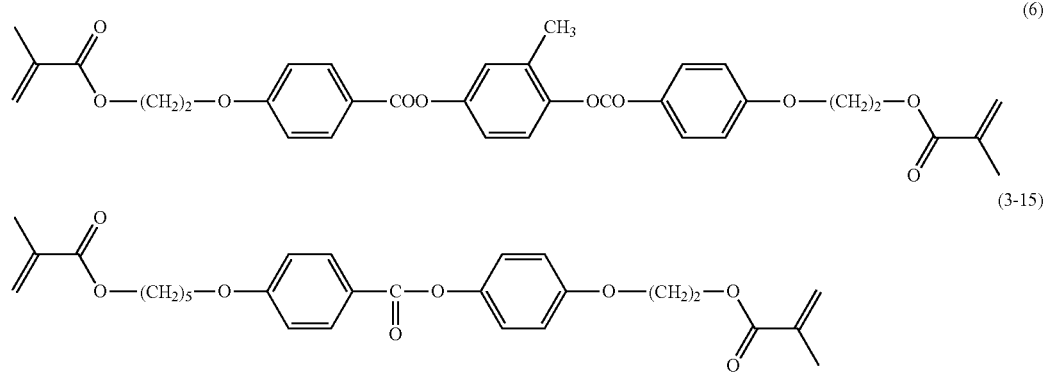
* * * * *